(12) United States Patent
Boudville

(10) Patent No.: US 10,673,924 B2
(45) Date of Patent: *Jun. 2, 2020

(54) MOBILE MAPS CONNECTED TO AUGMENTED REALITY GAMES VIA LINKET

(71) Applicant: Wesley John Boudville, Perth (AU)

(72) Inventor: Wesley John Boudville, Perth (AU)

( * ) Notice: Subject to any disclaimer, the term of this patent is extended or adjusted under 35 U.S.C. 154(b) by 387 days.

This patent is subject to a terminal disclaimer.

(21) Appl. No.: 15/330,744

(22) Filed: Nov. 2, 2016

(65) Prior Publication Data

US 2018/0124148 A1    May 3, 2018

(51) Int. Cl.
*G06F 15/16* (2006.01)
*H04L 29/08* (2006.01)
*H04L 29/06* (2006.01)
*H04W 64/00* (2009.01)
*H04L 12/58* (2006.01)
(Continued)

(52) U.S. Cl.
CPC .............. *H04L 67/02* (2013.01); *A63F 13/25* (2014.09); *A63F 13/61* (2014.09); *A63F 13/828* (2014.09); *G06Q 30/0267* (2013.01); *G06Q 30/0273* (2013.01); *G07F 17/3244* (2013.01); *H04L 51/32* (2013.01); *H04L 67/34* (2013.01); *H04L 67/38* (2013.01); *H04L 67/42* (2013.01); *H04W 64/006* (2013.01); *A63F 2300/534* (2013.01); *A63F 2300/8082* (2013.01)

(58) Field of Classification Search
CPC ................................ H04L 67/02; H04L 51/32
See application file for complete search history.

(56) References Cited

U.S. PATENT DOCUMENTS 8,433,800 B2    4/2013 Chor
2013/0110815 A1    5/2013 Tankovich
(Continued)

OTHER PUBLICATIONS

"Apps everywhere but no unifying link" by C. Dougherty, NY Times, Jan. 5, 2015.
(Continued)

*Primary Examiner* — Hua Fan

(57) ABSTRACT

The invention combines eSports and mobile Augmented Reality games. A mobile device runs a map. The map shows linkets for Non Player Characters and human players in AR games. Linkets can move on the map. If the user picks a linket, the game is downloaded and run. She becomes a spectator by seeing the Point of View or similar information of the NPC or human. She can meet a nearby human player. Increases social networking appeal of the game. The game can show ads. Having the game installed increases odds that the spectator becomes an active player. The map auctions linket locations and time slots to game companies or others. A winner can resell rights to a location, including subdividing the timeslot. Game companies get more downloads. The map gets user habits from an Intelligent Agent on the mobile device, to decide what linkets to show. When a user gets a route on the map, linkets appear on the route, increasing chances that she will pick a linket and play the game. A ride sharing app shows a map. A user uses the app to get a ride. The app shows linkets in the map. The app knows that the user is not driving a car. Playing the linket game is safer.

2 Claims, 23 Drawing Sheets

(51) Int. Cl.
*G06Q 30/02* (2012.01)
*A63F 13/828* (2014.01)
*G07F 17/32* (2006.01)
*A63F 13/61* (2014.01)
*A63F 13/25* (2014.01)

(56) References Cited

U.S. PATENT DOCUMENTS

| | | |
|---|---|---|
| 2013/0334300 A1 | 12/2013 | Evans |
| 2014/0089413 A1 | 3/2014 | Evans |
| 2015/0154644 A1* | 6/2015 | Saxena et al. ...... G06Q 30/0269 |
| 2015/0156061 A1 | 6/2015 | Saxena |
| 2017/0354884 A1* | 12/2017 | Benedetto ............. A63F 13/537 |

OTHER PUBLICATIONS

"Deep linking's big untapped potential" by M. Thomson, venturebeat.com, Aug. 9, 2015.

* cited by examiner

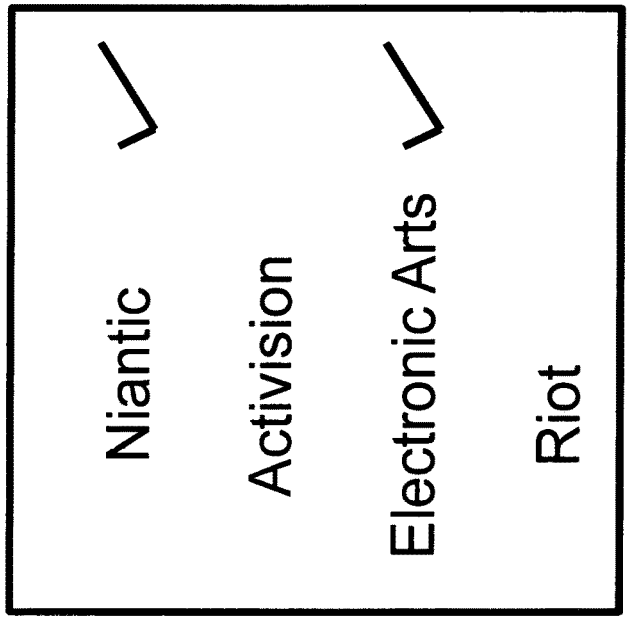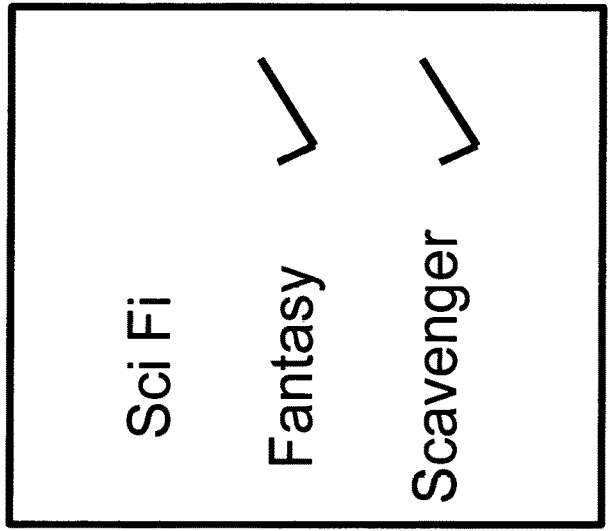
Figure 4

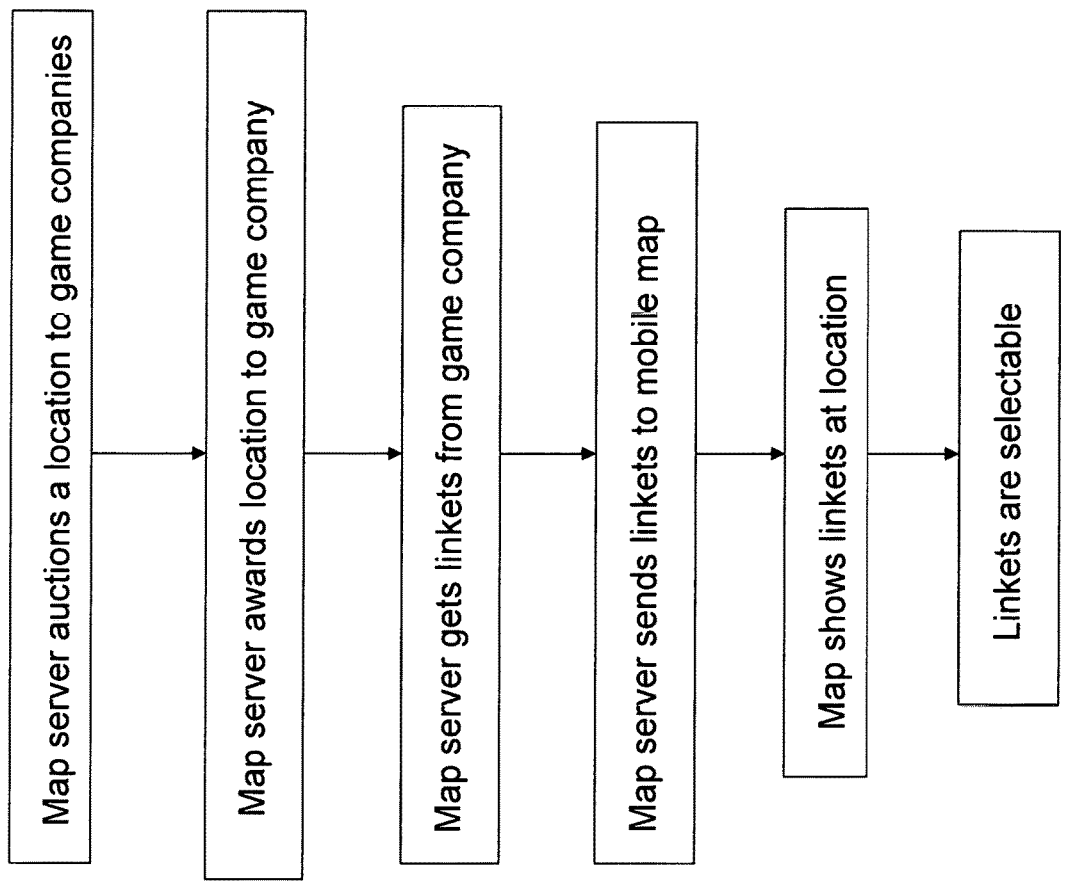

Figure 15 - Popularity

MOBILE MAPS CONNECTED TO AUGMENTED REALITY GAMES VIA LINKET

REFERENCES CITED

"Apps everywhere but no unifying link" by C. Dougherty, New York Times, 5 Jan. 2015.
"Deep linking's big untapped potential" by M. Thomson, VentureBeat.com, 9 Aug. 2015.
"Generating and presenting deep links" by V. Tankovich et al, US Patent Application 20130110815 (Oct. 28, 2011).
"Methods and systems for facilitating an online social network" by C. Evans, US Patent Application 20140089413 (Dec. 6, 2013).
"Text-synchronized media utilization and manipulation based on an embedded barcode" by C. Evans, US Patent application 20130334300 (Mar. 27, 2013).
"Swart link system and method" by J. Chor, U.S. Pat. No. 8,433,800, (28 Feb. 2011).
"Deep linking to mobile applications" by S. Saxena et al US Patent Application 20150154644 (Dec. 2, 2013).
"Deep linking to mobile applications" by S. Saxena et al US Patent Application 20150156061 (Dec. 2, 2013).

TECHNICAL FIELD

Deep links for mobile apps.

BACKGROUND

The applicant does not drive a car. He uses buses and trains. He has observed widespread use of mobile devices by fellow passengers. Often they run a map that shows the location of the vehicle in the region. Given the likely boredom of the users and the prevalence of map apps on the devices, there is an opportunity for the map company to garner more revenue.

The applicant also noticed that many people in Los Angeles currently use Uber and Lyft for ride sharing. The apps for these services show maps. The apps also know to high confidence that their users are not driving vehicles.

Recently, mobile augmented reality (AR) games have become widely popular. One game is Ingress by Niantic Corp., while another is Pokemon Go, also by Niantic. Both games (and other games by other firms) use the location of the mobile device (typically a cellphone). The location is usually found by satellite (GPS) anti sometimes also using basestation data from the cellphone carrier. A game takes the location and puts the user into the game. If the game uses AR, this can involve showing a map or some other representation of the surroundings, and showing other players or other features of the game. These features can and indeed often are computer generated opponents, i.e. Non-Player Characters (NPCs), or targets that the user is after.

Mobile apps have a distinctive problem. Most are currently standalone programs that often just converse with an app server run by the company that wrote the app. The apps do not have URL links within them. In general, an app from one company does not interact with an app from another company.

Separately, it is much harder for a search engine, which is optimised to search the Web for webpages, to search arbitrary apps. There is no standard syntax equivalent to an URL or URI to enable this.

To enable such and other functionality in mobile apps has been termed 'deep linking' within apps. (The term also has an earlier use that refers to standard web pages and URL links within them. This submission does not use that earlier meaning.)

Major companies have several projects aimed at defining deep links. Facebook Corp. has App Links. Google Corp. has App Indexing and Google Intents. Twitter Corp. has App Cards. Apple Corp. has Apple Extensions. Yahoo has 2 US patents. There are also several startups, like Bit.ly, Branch Metrics Corp., Button Corp., Deeplink Corp., Fukurou Corp., Haptik Corp., Hoko Corp., Linkfire Corp., Quixy Corp., Tapstream Corp., URX Corp., Wildcard Corp., and Yozio Corp., each with its own initiative. The syntax and functionality vary between these company specific efforts.

We recommend that if the reader is new to the idea of deep links, to read 2 articles. "Apps everywhere but no unifying link" by C. Dougherty, New York Times, 5 Jan. 2015. And "Deep linking's big untapped potential" by M. Thomson, VentureBeat.com, 9 Aug. 2015. Both at least at this time of writing are available online. They are well written. The first article is accessible to the general reader. The second article has slightly more technical details. They give an understanding of deep links and the business potential, as understood publicly in the prior art of 2015-6.

BRIEF DESCRIPTION OF THE DRAWINGS

FIG. 4 shows example menus for depicting games in a map.
FIG. 6A is a flow chart of the map server auctioning locations.

DETAILED DESCRIPTION OF THE PREFERRED EMBODIMENT

Figure 1:
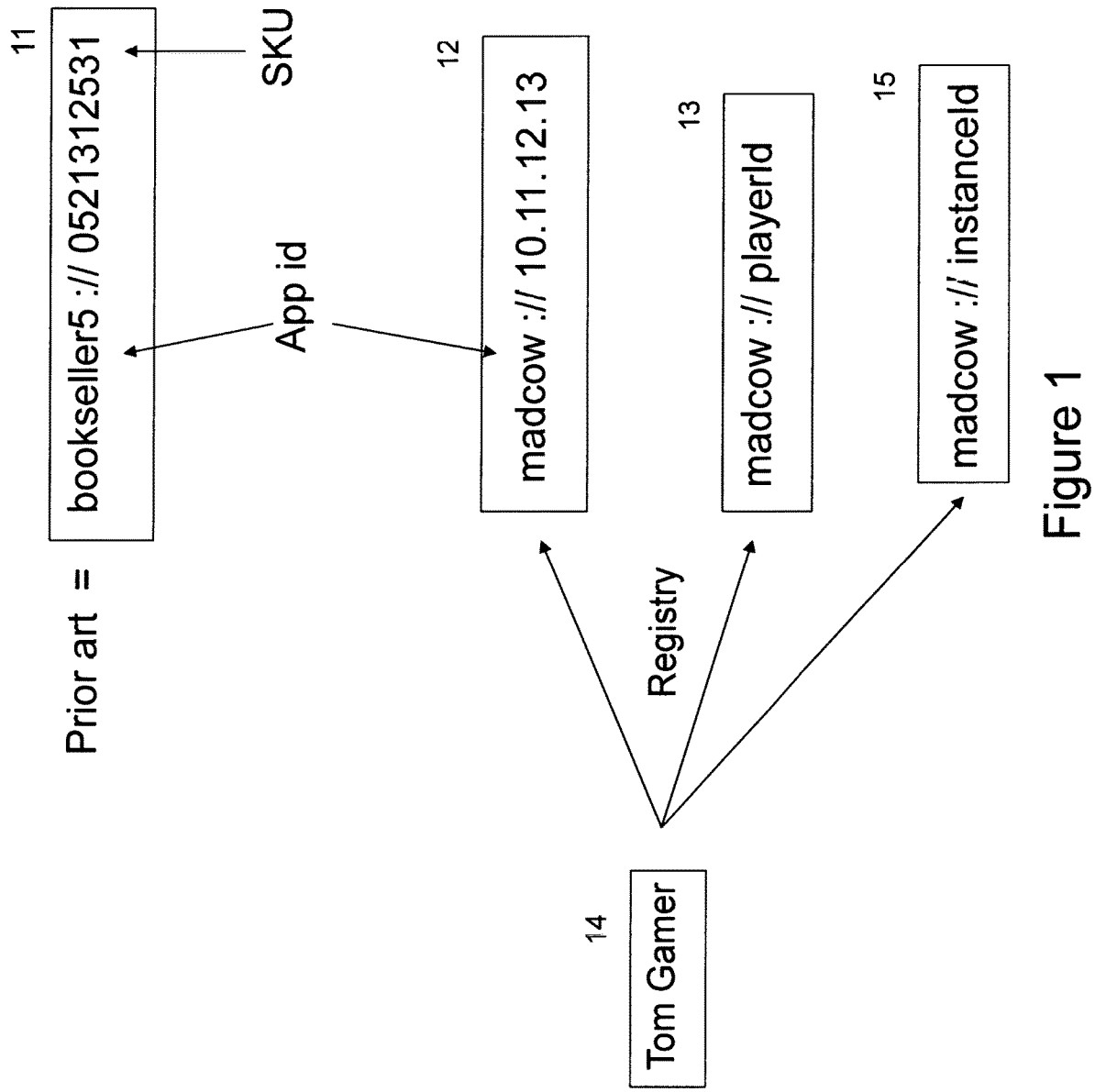
FIG. 1 shows a deep link and linket.

What we claim as new and desire to secure by letters patent is set forth in the following claims.

This submission refers to our earlier submissions to the US PTO: "Cellphone changing an electronic display that contains a barcode", filed 16 May 2011, U.S. Pat. No. 8,532,632 ["1"]; "Using dynamic barcodes to send data to a cellphone", filed 28 Jul. 2011, U.S. Pat. No. 8,348,149 ["2"]; "Transmitting and receiving data via barcodes through a cellphone for privacy and anonymity", filed 4 Oct. 2011, U.S. Pat. No. 8,707,163 ["3"]; "Colour barcodes and cellphone", filed 16 Dec. 2011, U.S. Pat. No. 8,821,277 ["4"]; "Mobile device audio from an external video display using a barcode", filed 25 May 2012, U.S. Pat. No. 8,708,224 ["5"]; "Dynamic group purchases using barcodes", filed 29 May 2012, U.S. Pat. No. 8,655,694 ["6"]; "Chirp to control devices", filed 9 Oct. 2012, US patent application 20140098644 ["7"]; "Barcode-based methods to enhance mobile multiplayer games", filed 22 May 2013, US patent application 20140349746 ["8"]; "Barcode, sound and collision for a unified user interaction", filed October 2013, US patent application 20150113068 ["9"].

We have these co-pending applications for deep linking:
"Deep linking of mobile apps by barcode, sound or collision", filed Feb. 18, 2015, U.S. patent application Ser. No. 14/544,763 ["10"],
"Cookies and anti-ad blocker using deep links in mobile apps", filed Jun. 8, 2015, U.S. patent application Ser. No. 14/545,694 ["11"];
"Blockchain and deep links for mobile apps", filed Jul. 28, 2015, U.S. patent application Ser. No. 14/756,058 ["12"];
"Different apps on different mobile devices interacting via deep links", filed Aug. 18, 2015, U.S. patent application Ser. No. 14/756,208 ["13"].
"Linket to control mobile deep links", filed Oct. 19, 2015, U.S. patent application Ser. No. 14/756,815 ["14"].
"Capacity and automated de-install of linket mobile apps with deep links", filed Nov. 10, 2015, U.S. patent application Ser. No. 14/757,027 ["15"].
"App social network via linket and ads for mobile deep links", filed 11 Dec. 2015, U.S. patent application Ser. No. 14/757,261 [16]
"App group, ad bandwidth, hand off for linket and mobile deep links", filed 28 Dec. 2015, U.S. patent application Ser. No. 14/998,349 ["17"].
"App streaming, bidirectional linket, phone number for mobile deep links", filed 4 Jan. 2016, U.S. patent application Ser. No. 14/998,440 ["18"].
"Hashtag, deep link and linket for more user interactions", filed 7 Jun. 2016, U.S. patent application Ser. No. 14/999,625 ["19"].
"Bots for linkets and deep links", filed 16 Aug. 2016, U.S. patent application Ser. No. 15/330,146. ["20"]
"App social network of linket and deep link users", filed 16 Aug. 2016, U.S. patent application Ser. No. 15/330,147. ["21"]

We define some terminology.

This submission is mostly about mobile devices carried or worn by people. The most common mobile device is a cellphone. We take this word to also include "smartphone". The latter term arose to describe a cellphone that also had a camera and Internet access, when such features were relatively new to cellphones. Other types of mobile devices are tablets, laptops, notebooks, netbooks, PDAs and wearable devices.

We will make frequent references to "app store" and "app server". Despite the similarity in names, these are different entities. An app store is typically run by a maker of a mobile device (like Apple Corp., Microsoft Corp.), or a provider of an operating system for mobile devices (like Google Corp.). Software companies that make mobile apps submit these to an app store. So users can find the apps in the app store and download them to the mobile devices. An app server is a server run by one of those software companies. A mobile user can use her device browser to go to the website of the app server, to download the app.

When we later describe an instance of an app interacting with an instance of another app, we might say, for brevity, a statement like "the first app interacts with the second app", when strictly it should be "an instance of the first app interacts with an instance of the second app". There should be no confusion with the use of the shorter phrase. But when 2 instances of an app interact with each other, a more precise phrasing is needed, like "a first instance of the app interacts with a second instance of the app".

Related to this is a notational convenience. We shall refer to an app, and call it Alpha, for example, in the text and figures. Sometimes "Alpha" shall mean the app executable. Other times, it shall mean the id of the app, where the id is unique across "all" apps. In turn, "all" might mean across all apps in an app store for a given hardware platform. Or across all hardware platforms.

This submission has the following sections.
1: Linket and deep link;
2: Map and game;
3: Advantages of linket to game company;
4: Advantages of linket to map company;
5: Advantages to users:
6: Strict and loose definitions of AR;
7: Fuzziness and proximity;
8: Reassignable linket;
9: Temporary linket;
10: No linket Registry;
11: Intelligent Agent recommendations;
12: Audio;
13: Deep link with a network address;
14: Popularity;
15: Indoors and underground;
16: Shop interacting with a game;
17: Non-map app showing a linket;
18: Non-game linket or bot;
19: Warning to drivers;
20: Variants;
21: Human controlling a NPC;
22: Search;
23: NPCs responding to a route in a map;
24: Gamification in the map;
25: Player puts a linket on a map;
26: Ride sharing (taxis, Uber, Lyft, Didi);
27: Ride sharing with others;
28: Mobile App Mobile Store (MAMS);
1: Linket and Deep Link;

FIG. 1 shows examples of deep links. Item 11 is a deep link as defined in the prior art. It has 2 parts. One is an app id. This is an identifier of the app in an app store. The second part is what amounts to an id of an item in a product catalog. As a practical matter, the app is an ad app. The app is a front end to a database of products or services for sale. The database sits on a server on the Internet. Thus the item id can be considered to be a Stock Keeping Unit (SKU) or a page id. The latter is appropriate if the catalog is taken to be a set of pages; each page showing an item for sale.

Item 11 depicts the app id as 'bookseller5', to suggest that the ad app is selling books. To this end, the SKU is an ISBN (International Standard Book Number). It is important to note that the app id in general will not be in such a short and convenient semantic form. It most likely will be a longer string of semirandom characters. Difficult and pointless to remember.

Item 12 is a deep link we introduced in our earlier submissions 10-21. Like item 11, it has an app id. Here, we write an example id that suggests a game, Madcow. Item 12 has a second part, a network address. Here written in IPv4 (Internet Protocol version 4), but it could also be written in IPv6.

Items 11 and 12 are used in the following way. A user, Jane, gets the deep link on her mobile device. It might appear in a webpage shown on her mobile browser. Or it appears in an SMS message or tweet that she views in some suitable app. Or it appears in an arbitrary app. The commonality is that she can pick the deep link and by some low level means, the deep link is executed. The app whose id is in the deep link is installed on her device, if it is not already present. This involves her device going out to the app store for her device and downloading the app. The app is run with the input argument of the second part of the deep link.

In the prior art, the app gets the SKU and goes to its server to get the page for this item. The app shows the page. This is known as a contextual ad. Hence the prior art can be considered as a case of 2 apps on 1 phone. The first app has the deep link and causes the install and running of the second app.

In our earlier submissions, item 12 has a different effect. The second app (often newly installed) is given the network address in the deep link. This is the address of a program running and listening for a network query. This program can be the same program as the second app. So there are 2 instances of the second app running. One pre-existing instance is at the remote address. The other new instance is on the user's device.

This scenario can be considered to be 1 app on 2 devices. By this we mean 2 instances of that app, running on different devices.

If the 2 instances are each run by humans, then item 12 leads to a fundamentally different interaction than item 11. The latter has the user interacting with a server. The former can lead to a 2 person game or in general a 2 person interaction.

Item 13 is a variant of item 12. Instead of an explicit network address, it has a player id. The instance on Jane's device sends the player id (which is of another player already running the app on another device) to the app server. The app server then puts Jane into the same runtime instance as the other player. Call him Tom. In this case, the server might act as the intermediary, so that Jane and Tom's instances never make a direct network connection to the other. Or the server might pass one's network address to the other, so that they might directly interact, as well as continue to interact with the server.

In turn, item 15 is another variant. Here instead of the player id, there is an instance id of the game instance that Tom is in. Note that this instance id of the game is not the same as the game id, which is the id of the game executable in the app store.

For items 12 and 13, we depicted the app id as 'madcow', to suggest a game Madcow. But just like for item 11, in general the app id will not have such a short and semantically loaded meaning.

Item 14 is a linket. First defined in submission 14. It is a label or a brand, to be used whenever possible, in place of a deep link. Because the deep link has 2 problems. First, the app id has little semantic value as a long semi-random string. Second, the second argument of the deep link, be it a SKU or a network address or a player id, also has little semantic value. So the user who gets a deep link of the forms of items 11, 12, 13 or 15 cannot be expected to remember it.

This is exacerbated in the case of item 12. It has a network address. If this is an address of a mobile device, the latter can move and acquire a new address.

In answer to these objections, we introduced the linket in submission 14. A linket is a constant string (preferably in Unicode) that maps to a deep link. The mapping Is held at a computer server on the Internet. We call it a/the Registry. The mapping is roughly analogous to DNS, which maps between a domain name and an Internet address.

There are 2 differences. DNS maps the domain string to just an Internet address. We map the linket to the pair of an app id and a network address. Then, under DNS, the mapping takes some 1 to 2 days to propagate. Our Registry deals with the case where a mobile device might change its temporary Internet address several times a day.

Figure 2:
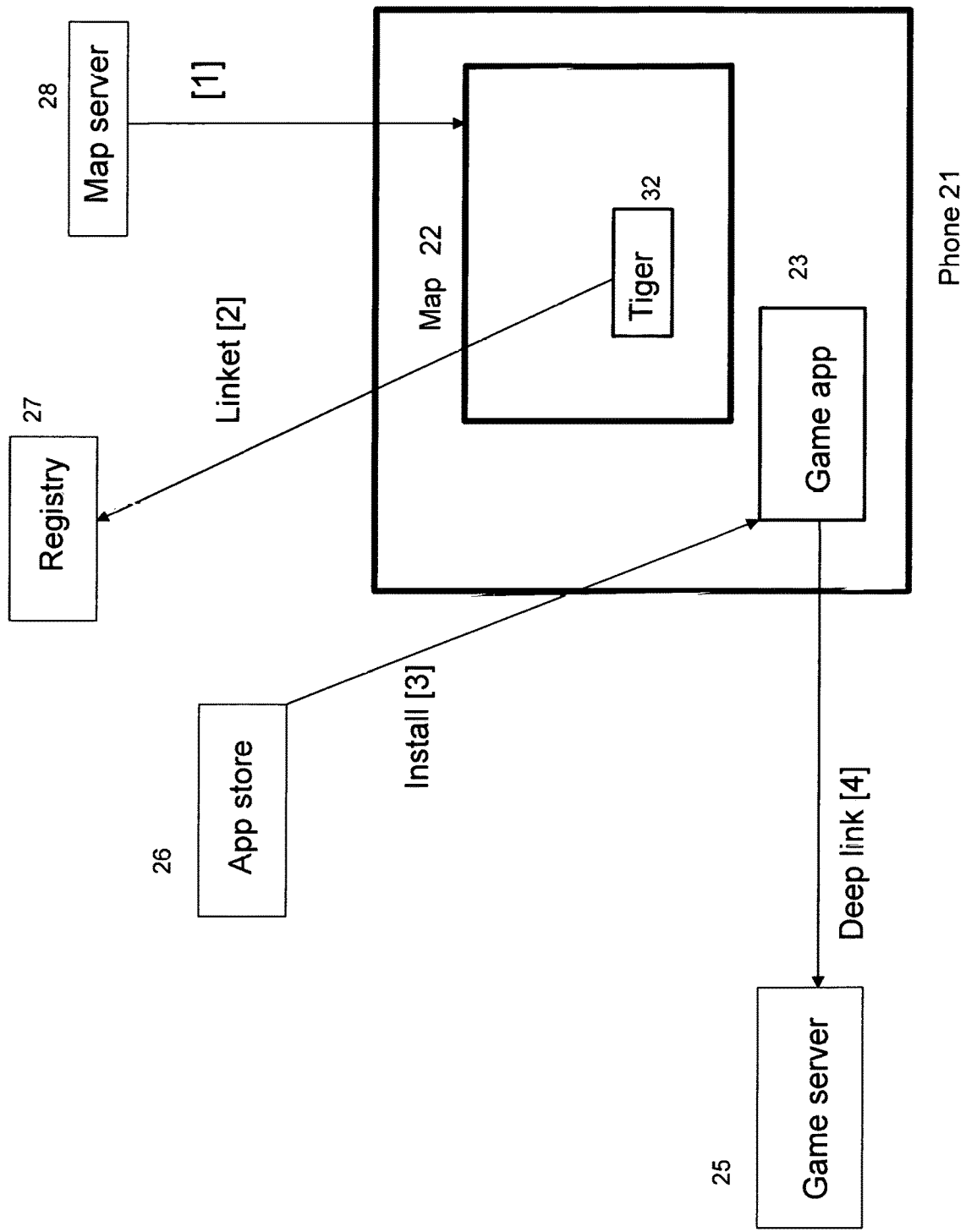
FIG. 2 shows apps on a phone interacting with servers.

2: Map and Game;

FIG. 2 shows Jane's mobile device, phone 21, in which there a map program, Map 22, already installed and running. Map 22 communicates with Map server 28. The combination of Map 22 and its server display some type of map for Jane. This is a common situation now that many mobile devices know their locations. Users want to know where they are and where to go.

Game app 23 is assumed not be installed on phone 21 at this stage.

Figure 3:
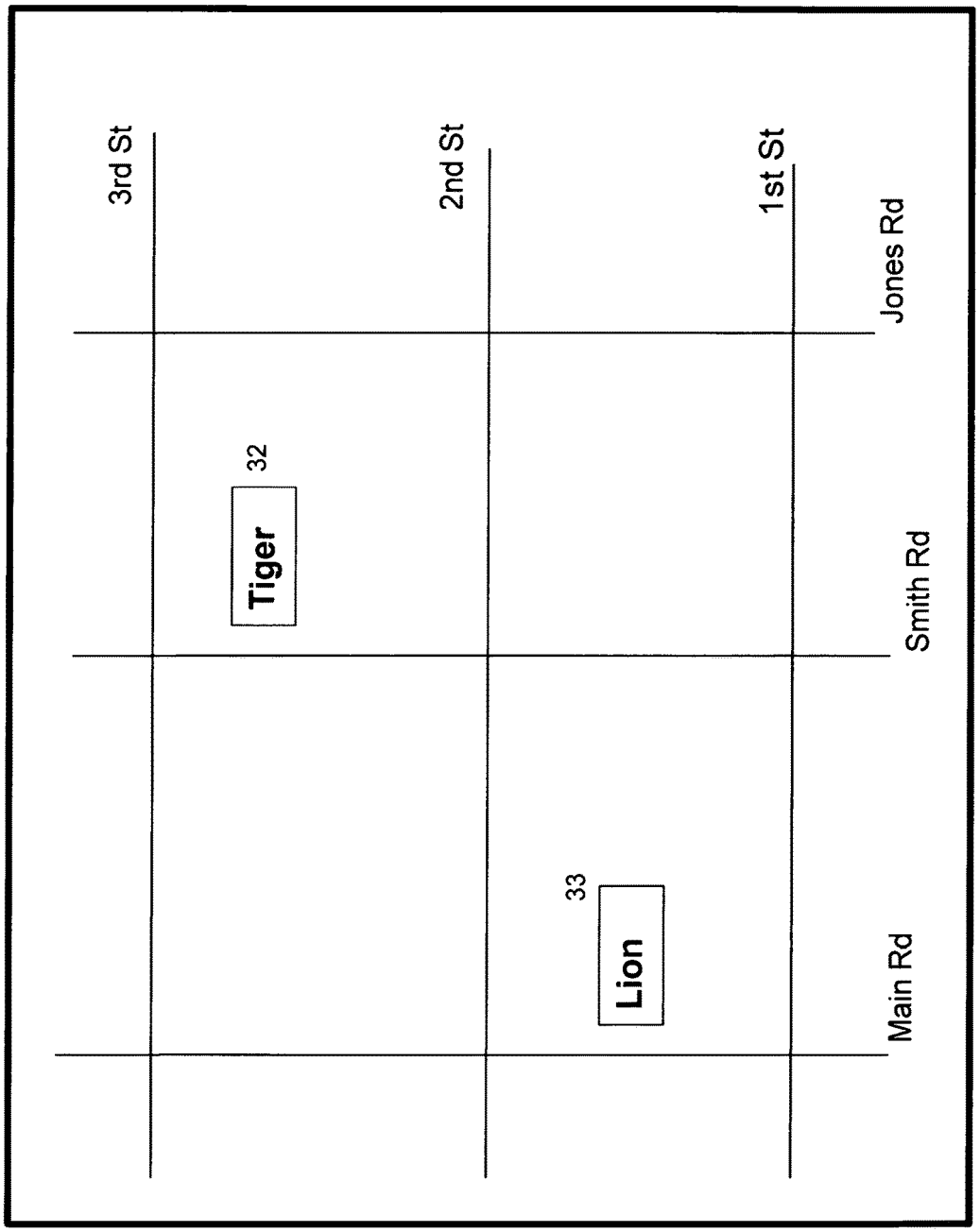
FIG. 3 shows a map including characters in games.

FIG. 3 looks at Map 22. The map is of some urban environment, with a street grid depicted. Going north (upwards in FIG. 3) there is First Street, Second Street and Third Street. Going east (to the right) there is Main Road, Smith Road and Jones Road. The map might show landmarks, like prominent buildings. It could also show shops that perhaps paid the map company to explicitly list them in the maps.

Suppose there is some option in the map to show fictional characters or locations in some location based game. This might be done by a tick box 31, shown as ticked. Or by some other graphical method. Like a double tap on the device screen, if the latter is touch sensitive. The result is to show characters Tiger 32 and Lion 33 on the map. The map might continue to show various real life entities like shops. For clarity these are not explicitly shown in FIG. 3.

Figure 3A:
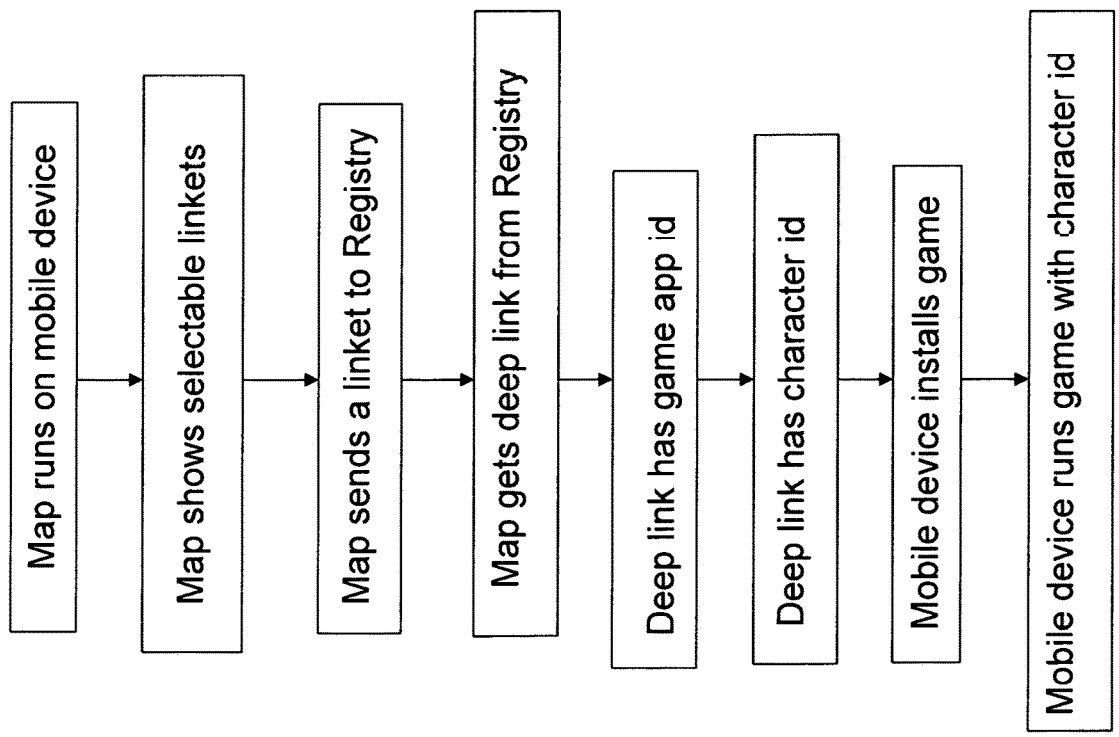
FIG. 3A is a flow chart of running a game via the map.

FIG. 3A is a flow chart depicting major steps in the method.

The characters can be from the same game or different games. An elaboration on the GUI tick box is some graphical method by which Jane can pick what types of games appear in her map. FIG. 4 shows 2 types of menus that the map can implement. Item 41 is a vendor menu. The names of 4 game companies are shown. Jane picks Niantic and Electronic Arts. So AR games by those companies might have characters that appear in the map. Each vendor could have 1 or more such games.

A different way is via item 42, which is a genre menu. It divides the games into 3 types, fantasy, science fiction and scavenger. There could be more than 3 types. A game vendor might classify its AR games into these types. The types are not necessarily mutually exclusive. A given game might be put by its vendor into 2 or more genres.

There might be other types of top level menus, using means other than vendor or genre, to group games.

In turn, there might be lower level menus. These could explicitly show specific games, for example.

Another way that the map could decide which linkets to show is as a function of what game apps are currently on Jane's device. Periodically, the map could find or get a list of these apps. It uploads these to the map server, along with a choice. To preferentially show linkets using these apps or not.

One reason to show linkets with those apps is if Jane likes those games and wants to play those in the context of her travels. With a second advantage that she does not have to take time, bandwidth and more storage space on her device to install another app.

Conversely, she might be interested in finding new game experiences, so she instructs the map to show linkets for games not on her device.

A variant is where the map finds the amount of spare memory left on her device. The map tells the map server this amount. The server can in future only download linkets to the map that point to apps that will fit into the spare memory. This can save Jane future inconvenience. Where she picks a linket, pointing to an app she does not have, and the download is not possible unless she frees up space on her device.

However, a variant on the previous paragraph is where she tells the map not to do this filtering. She is still interested in future games, even with greater inconvenience of installing.

In FIG. 3, the characters Tiger and Lion can be represented as the content of linkets. Suppose these are in the same game. The game vendor can purchase appropriately named linkets from the Registry. From the previous section, it can be seen that the linket offers more semantic value, which is better branding, than a low level, hard to remember deep link.

A linket can also have associated data, as per submission 14 and later submissions prior to the current submission. Specifically, a linket might have graphics, including a small icon (possibly termed a favicon) or thumbnail. This can be depicted in map 22 instead of or in addition to the textual name of the linket.

We stress how the current submission differs from the prior art of games. In those games, the player might see maps, and the maps could show locations of opponents or targets. But those maps are shown in the game app itself. In other words, you have to first load the game onto your device, to then see features and players in the game.

Map 22 is fundamentally different ab initio. The game from which the characters hail is not the map. In general and more importantly, this game in general does not yet exist on Jane's device. In some cases Jane might already have the game on her device.

Now suppose Jane is interested in playing the game, and that she has never played it before on her phone. Map 22 makes Tiger 32 and Lion 33 selectable. If Jane picks Tiger 32, her phone goes to Registry 27 with this linket. If Tiger is shown as a graphic, it can be supposed that the map has both the graphic and the text of the linket, and the map sends one or both to the Registry. It may only need to send one, if that is sufficiently unique to identify the linket.

The Registry returns the deep link. Jane's phone installs the game from app store 26. It starts the game as item 23 in FIG. 2. The game app contacts its game server 25. And the game app instance gets the second part of the deep link. (The part that is not the app id.) This can be the identifier of the character Tiger at the location in the map in FIG. 3.

A game can also show the locations of human players. See FIG. 5. The human players 'Ann Shoots' 51 and 'Bob Hunts' 52 are displayed. These are linkets owned by humans. The game and the map can make these clickable. The text content of these example linkets is supposed to have been chosen by the players when they setup their linkets with the Registry or the game server.

If Jane clicks on Ann Shoots 51, Jane's phone might install the game if it is not already present. When the game starts on her phone, it could show the game from Ann's Point of View (PoV). Depending on the game, this might actually be images taken from a camera on Ann's device. Another type of game might show schematics based on Ann's location.

This is eSports. But a type different from what is currently considered eSports. Jane is watching on her device Ann play. If other people in the area (or more remotely) pick Ann Shoots on their phone, then they join Jane as Ann's audience. That Ann is close to Jane (a few blocks away) increases the chances that Jane might actually walk over to Ann and meet her. Potentially a key advantage. In the AR games Ingress and Pokemon Go, it was widely noted that an important feature was people meeting other players in person. A physical social network that drove game play. Those games are not eSports.

Current implementations of eSports typically consist of spectators on desktop computers or cellphones going to a website like Twitch or YouTube and watching live (or recorded) games. For live games, spectators do often interact with the players, by sending them short messages via those websites. But the spectators and players are essentially physically isolated from each other.

This submission can avoid issues about privacy for Ann. She could explicitly give permission to the game server to broadcast her location on third party maps. Perhaps just to get an audience. More tangibly, she could be compensated in some manner by the game company, the map company or the audience, for her gameplay.

If Jane watches Ann and is impressed, Jane might donate some fictitious money or real money to Ann.

In the above, we said Tiger and Lion were at specific locations on the map. This can be approximate. The characters might be shown at the locations they were recently at. Or the location of the character might be its location averaged over the last 24 hours, say. Or the location on the map might be the position of a place that the character has to 'defend'; where the character has the leeway to wander to add unpredictability to the game.

A simple extension is where the map shows where a character will be at some future time.

Another extension is where Jane picks a linket and asks the map for directions to it. A map already lets users ask for directions to a conventional location, like a store or park shown in the map. The map can treat a linket with an associated location in the same way.

Suppose a game is popular and played in many cities. It has a character Tiger. It wants several instances of these. Perhaps several in each city. The mapping of a linket to a deep link in the Registry can readily be generalised to accomodate this need. Imagine we are in Los Angeles. See FIG. 6. Registry 60 holds a mapping from linket 61 to several deep links. When the Registry gets a linket from an external device, the device also sends it an approximate location. The Registry then finds a deep link associated with a location closest to the device.

The external device could be a mobile device, with the map app running on it and asking the Registry. Or the external device could be hosting the map server, and the map server is asking the Registry.

Figure 6:
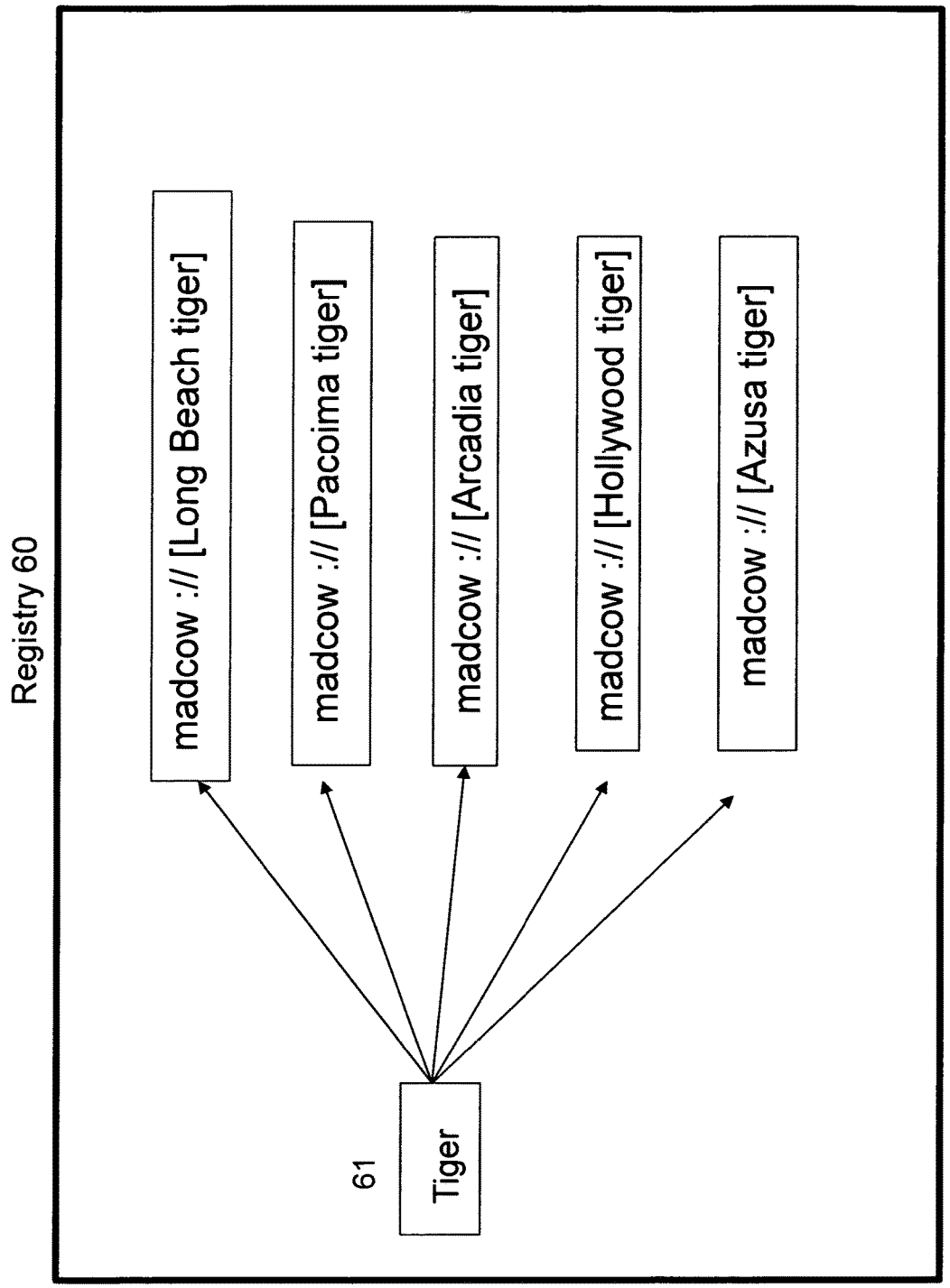
FIG. 6 maps a linket to deep links associated with different locations.

In FIG. 6, the deep links are symbolically depicted as functions of various locations (suburbs) in Los Angeles. In practice, something like a standard latitude and longitude ('lat-long') pair could be written into the deep links. Or, as suggested earlier, just a character identifier, which is semantically opaque to humans, but which maps to characters in each of those suburbs.

Thus in Map 22, any instances of the characters in the scope of the map would be shown.

The Background section noted the possible boredom of many users who run maps. This offers another advantage for the submission. Suppose the user clicks on a linket and it causes the download of a (game) app that does not exist on her device. This can take some time if the app is large. While this is true in general of downloading, if she is bored the download time is less of a disadvantage. Compared to when she has more pressing needs.

Suppose there is a NPC that the map can show. But the map also knows that the game app pointed to by the NPC linket is not on Jane's device. The map might decide not to show the NPC until Jane is within some given distance away. The point is that if Jane picks the NPC, there will be no need to load a game app. So she can go immediately into the game and interact with the NPC. The decision by the map can be in part made by the game company. The latter could have a parameter giving this distance, and another parameter that tells the map to do the steps in this paragraph. These parameters are passed to the map, perhaps via an API established by either party.

3: Advantages of Linket to Game Company;

In the previous section, suppose instead of using linkets, the clickable items in the map invoked a single app. In this app, Jane could watch the different games whose characters are shown in the map. This corresponds to eSports apps like those by Twitch Corp., Kamcord Corp., and Mobcrush Corp. Those are apps in which the user can pick different games and then see live or already recorded video of gameplay. But the viewers are seeing screen captures of the game screens.

In contrast, when a linket is used to install an instance of the actual game on Jane's device, when she watches, without playing, she is doing so in an instance of the actual game program. It is a short step for her to become an active player herself if the game proves interesting enough. For the game company, and every app company, the hardest step is the first one. Persuading a user to download the game onto her device. Questions of retention and usage are moot if this is not done.

Plus, suppose Jane never plays the game. Even as a pure spectator, the game company can benefit. It can show ads. And perhaps offer to suppress the ads if Jane pays something. Separately, it can try to get her contact information, like her email address and other demographics. It can later try to interest her in other games it has, for example. Either also to watch or perhaps and better, to play.

In the context of showing ads to Jane, this was ads by third parties in a manner that could be suppressed. But there could be ads that are not suppressable. Ads built into the game itself. Imagine a spy game where the hero drives a Bugatti. The ad is the display in the game play of a luxury car. This is a reason why to the game company, a large audience is valuable because the company uses this to increase the ad rates it charges.

A key point is that now Jane is a customer (paying or non-paying) of the game company. There is no intermediary between the company and her. Whereas with traditional eSports companies like Twitch, the game company knows little or (more likely) nothing about who is watching its games via Twitch.

Another advantage is if the game is not one of the, say, top 1% or 5% of mobile games. It is hard for most games to garner attention. Now a typical game company can pay the map to show its characters. And if the game company picks areas of town where there is plenty of foot traffic but relatively few other game characters being shown by the map, then it has a greater chance of being noticed by the populace.

4: Advantages of Linket to Map Company;

The map company can get revenue from the game companies whose linkets are shown in the map. This revenue can be in part a function of how many linkets from a given game company are shown. Also, it could be a function of how many times a linket is clicked in the map.

The marginal cost to the map company is small. Most of the complexity in the map is the knowledge of the traditional static elements, like the roads and buildings. Overlaying some time dynamic features like the linkets is straightforward.

The map company can auction off locations. Some locations, like Times Square New York or the Loop of Chicago, can be high value to game companies to place and thus advertise their characters. The map company can charge accordingly. The auctioning can be in the spirit of how Google determines ad rates for search terms. Typically, it simply lets advertisers bid on a search term.

Conversely, for some locations, the map company can set fixed prices.

As an inducement for game companies to bid, the map company can make available a history of previous prices for locations and the bid histories for those locations. This gives game companies, especially those that have never bid for any location or for a specific location, more assurance about bidding and how much to bid. Potentially improving liquidity in the auctions. Extra data can include the history of click rates for linkets that appear on the maps at those locations.

A variant is to consider a winning bid for a location by a game company. Maybe by the nature of the game, the company only wants a maximum number of displays of its linket. After which it does not want its linket shown on the map. The map company has at least 2 choices. If the linket is no longer shown, the map can open the location for a new auction. Possibly the map company emails this to other game companies who previously bid on that or nearby locations. Or who signed up to be notified about the open location. The drawback is the opportunity cost in the time between the ending of the showing of the first linket and the showing of a linket from the next winning company.

A second choice is in the format of the earlier auction that awarded the location to the first game company. That auction can also select a second company amongst the bidders. This could simply be the company that made the second highest bid. When the linket for the first company is no longer shown, the linket for the second company will now be shown. And the second company is charged at this time.

This can be generalised to having a queue of more than 2 such winning game companies for a given location.

There are variants to the winning game company defining a maximum number of displays of its linket. It would seem simpler for this to be the maximum number of clicks on its linket, which would lead to the same number of calls to the game server. But when the linket is shown on a user's device, there is no assurance that she will click it. So the number of displays can be used as an alternative pragmatic proxy.

Another revenue source to the map company is to let a location (which can be an arbitrary region demarcated by a geofence) be off limits to a given game or games, or to a type of game (like sci-fi) or to all games. The entity that wants this can pay the game company some amount for the denial. Note that the entity does not need to be a game company. It might be a property owner in that location who does not want players wandering around in a game. This includes the case where the players might be wandering on public property near or around the property, and hence the owner cannot restrict them from doing so.

One example might be a cemetary, to which the public has access. The cemetary owners (possibly a local town council) do not consider it appropriate for games to be played there. But perhaps they cannot outrightly ban this. So they pay the map company.

This off limits could be time limited. Perhaps for a scheduled parade or street festival or funeral procession.

Whereas for a popular location there could be several game bidders, it can be more likely that there is only 1 entity who wants to turn off linkets for a given location. The map company might still incorporate the entity in the auction.

One variant on the above is where a winning bidder (game company) wins the right to show several characters in the area for which it won the bid. Up to some maximum that can be imposed by the map company. In part, this can be due to the greater storage and bandwidth requirements at the map server for all those extra characters.

The map company can impose a limit on how many of these characters (for a given area) it will download to a given mobile device. This avoids unduly using too much inbound bandwidth on the mobile device, and too much storage on it.

There are 2 cases. The first case is where for a given mobile device, only 1 character is shown. So there is no extra bandwidth or storage burden on it. But the map server still has the extra storage and bandwidth for it getting the characters from the game company. The second case is where a given mobile device can get up to some maximum number of character for that area.

The map company could have a pricing policy like the following. Suppose the game company wins the auction for $10 to show 1 character at the area. The map company charges an extra $2 per character for a limit of 4 characters total. Where here only 1 character is shown on a mobile device. And the map company has a different pricing for a mobile device to get more than 1 character.

The map company can say that for a given area, there are simultaneous auctions. One auction might be for fantasy games, another auction for science fiction games. Etc. The point is that a winning game company will not have characters from games in its genre also appearing in the area. But characters from other games in other genres might. This potentially increases the revenue for the map company.

Previously, we suggested that for popular districts, a winning bid for an area can be higher than for less popular districts. The map company might also define areas that differ in size. A less popular district has larger areas to bid on than a popular district. So the Bronx, Brooklyn or mid Manhattan could have larger areas compared to lower Manhattan.

Now consider a game company that won an area to show its characters. The company might set conditions to further determine when its characters appear. For example, some characters should only appear on the map at night, while others appear in the daytime. Clearly, the map company has access to when daylight or night time are in a given city, so the map company can implement this. Without the game company necessarily having to explicitly specify the desired hours. This frees up the burden on the game company.

Imagine a game company that wants its characters to appear across 100 cities in North America and Europe, at night. It just has to tell the map company.

Another example is where the game company wants its characters to appear only when the temperature is below or above some value. Or when it is snowing or raining in the city. Or conversely, when it is not snowing or raining. The previous sentence could be more likely for games where users are expected to wander outside.

The weather constraints can be handled by the map company, if it has access to local weather data for the city. Thus the map company might access a weather server that has access to weather data across a region.

So far, the auction was for a given area and some time interval that starts at a given time. Now consider how else the time factor can be used at a given area. There could be several simultaneous auctions. For non-overlapping time intervals. Some intervals, like Friday through the weekend, could be in higher demand due to greater weekend crowds. Similarly for a time interval during a public holiday. Or an interval around an upcoming scheduled major sporting event or festival, if the area is at or around that event.

For example, suppose in an area with high pedestrian traffic, that traffic peaks from noon to 9 pm. From 9 pm to 1 am there is less traffic. And from 1 am to 6 am, barely any. There is little use to a game company if its characters appear on the map at equal probability for all hours. In anticipation, the map company can define time slots for a given area. So a time slot from 1 am to 6 am might be very cheap to acquire, if any game company is interested.

The map company can have different policies about time intervals, for different locations. For a prime location, it might have an auction for an entire year or years. The winning game company gets an exclusive appearance for its characters on the map for the location. This lets the game company do extended branding, where it puts ads in other media, associating itself with the location.

Above, we described how the map company can run an auction for a given area. Suppose a given game company wins that area. The map company can let the game company sell or give or exchange that "title" to another game company. On the proviso that the new owner of the area can only show a game in the same genre as the original game company, if the auction was for a given genre of games. More generally, if the map company imposed other conditions on the bidders, then a winning bidder might be able to transfer title to another company that needs to follow those restrictions.

This can be generalised. The map company can let anyone bid on a given area in a city. The bid might be restricted to a given genre of game, or not. The winner can then resell the title to the area to another entity, who inherits any restrictions imposed by the map company. This deliberately encourages speculation by non-game companies. Giving liquidity to the auction, or to whatever sales mechanism was used by the map company.

One example is a shop. Suppose it is a coffeehouse or bar. It bids on and wins control of the streets around it. It can contact (or be contacted by) game companies. It lets them put their linkets on the map. But it wants those games to involve or direct the players to walk by or (even better) go into the shop. The reason is that the game might want its players to have a meeting place where they can chat and take refreshments. Increases the social attraction of the game, and gives business to the shop.

In this scenario, it is an open question who pays who, between the shop and a game company. The shop might sublease the area or even offer it free to the game company. Hoping that increased business will compensate for the cost of acquiring the area from the map company. Carrying this further, suppose the game is very popular. The shop could even pay the game company to show its characters on the map, leading players to the shop.

Consider a game company who won an area for some time interval. The map company lets it divide that interval into subintervals. Some of the latter can be sold to other game companies to show their characters. A nuance is that this involves extra incoming bandwidth and storage on the map server. Hence the map company might charge extra. This can be charged to the first game company or to the other game companies. Possibly for operational ease, the map company would charge the first game company. In whatever mechanism the latter does to sell subintervals, it can pass the charge on in some manner. Maybe explicitly as an add on fee. Or the first company absorbs it into what it charges the others.

We described how a game company can win an area, to show its characters on the map. The characters can be NPCs as well as human players. Each game makes its own decision on whether to only show NPCs, only show humans or both.

There is a third case. A game can refer to a physical location, and have perhaps a visual overlayer that is shown in AR for that location. The location is not a NPC, but can be considered part of the game. The location could be a linket in the map.

One caveat to the previous paragraph is where the map company might impose restrictions on an area. So it will only show NPCs in that area, for example.

The game company winning a bid can restrict which mobile devices its characters do or do not appear on. For example, the company can require that its characters only appear on an Apple mobile device instead of Android or other types. Maybe the company only has a version of its game for Apple. Remember that the linket maps to a deep link, and the latter can be restricted to apps for a given mobile platform. In this example, if the game only exists on Apple devices, it can be useless for its characters to appear on the map when the map runs on an Android device. Clicking the linket for a character will not lead to the user being able to watch or play the game on the latter.

Or even if the game exists on all platforms, perhaps the AR experiences are best done on an Apple. So the company deliberately wants the map to only shows its characters on an Apple, for the best game interactions.

Here we depicted the mobile devices as just being 2 types—Apple and Android. This generalises to more types if such become significant in the marketplace.

FIG. 6A is a flow chart depicting major aspects of the method.

Figure 6B:
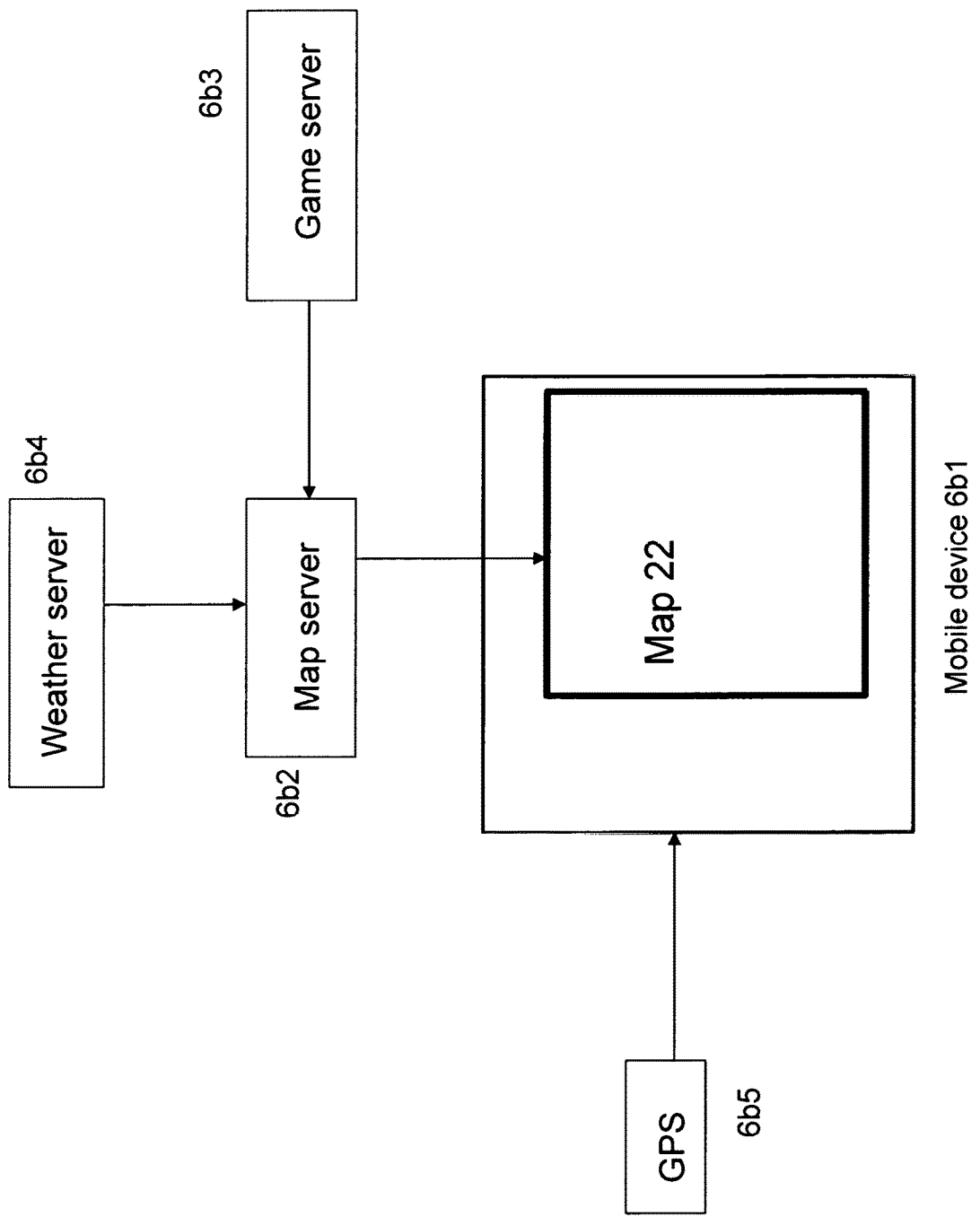
FIG. 6B shows a map using a weather server, a game server and GPS.

FIG. 6B shows Map 22 running on mobile device 6b1. The device has access to GPS data from a satellite network 6b5. This GPS data is then accessible on the mobile device by map 22. The GPS can be considered a proxy for any remote geolocation method. Possibly including interactions with cellphone basestations and WiFi or WiMax hotspots or other wireless beacons.

Map 22 is controlled largely by map server 6b2. The user of the mobile device of course exerts some control on map 22. In turn, the map server gets data from game server 6b3 and a weather server 6b4. For simplicity in FIG. 6B, we omitted the inclusion of a linket Registry to map a linket on map 22 to a corresponding deep link. The Registry should be considered implicit in the figure, if the Registry exists. Elsewhere in this submission, we described how the Registry might be omitted on some configurations.

The arrows in FIG. 6B designate major directions of data flow. But data can also flow in the opposite directions to those arrows. The map 22 can and in general will send data upstream to the map server. Specifically and importantly, the data might include the location of the mobile device, as found from GPS.

This section largely discussed the map company showing a map of the outdoors to a user on a mobile device. Currently, most maps do not go into covered areas, like an enclosed shopping mall. Mostly because the device location is often found by using GPS (or other) satellite data, which is not accessible indoors. And within an enclosure, if there are several floors, there is no map showing which floor the user is on. However over time this problem can be ameliorated by various advances in the hardware of the mobile devices, probably in tandem with the use of beacons or other hardware in the enclosed areas. Given these, the methods of this section can be used when the map is of an enclosed area. There could be linkets of game characters on the map.

5: Advantages to Users;

Consider our user Jane. If the steps of this submission are implemented by the map, then she can find games that she perhaps is not aware of. The alternative is for her to, say, read about mobile AR games in social media, to download some of these, and then run 1 or more of them while outdoors.

This is cumbersome. It likely favours already popular games, that are heavily written about. In mobile gaming, just like other mobile app topics, the top 5% or 1% of apps garner a disproportionate amount of revenue and attention. Our method lets Jane find out about more games as she wanders.

6: Strict and Loose Definitions of AR;

There is no official standards body that defines Augmented Reality. Rather, informal definitions are used by companies and experts. A strict definition involves the AR graphics being overlaid on the user's vision. But some games might not fit this criterion. The user's phone might show graphics, but not overlaid on a background that comes from the phone's forward facing camera showing the scene in front of the camera, on the phone screen.

This submission also considers similar games to be AR.

Another remark concerns Mixed Reality (MR). The scope of this can also pertain to MR games and applications. As to whether a given game might be AR or MR may be arbitrary semantics.

Figure 7:
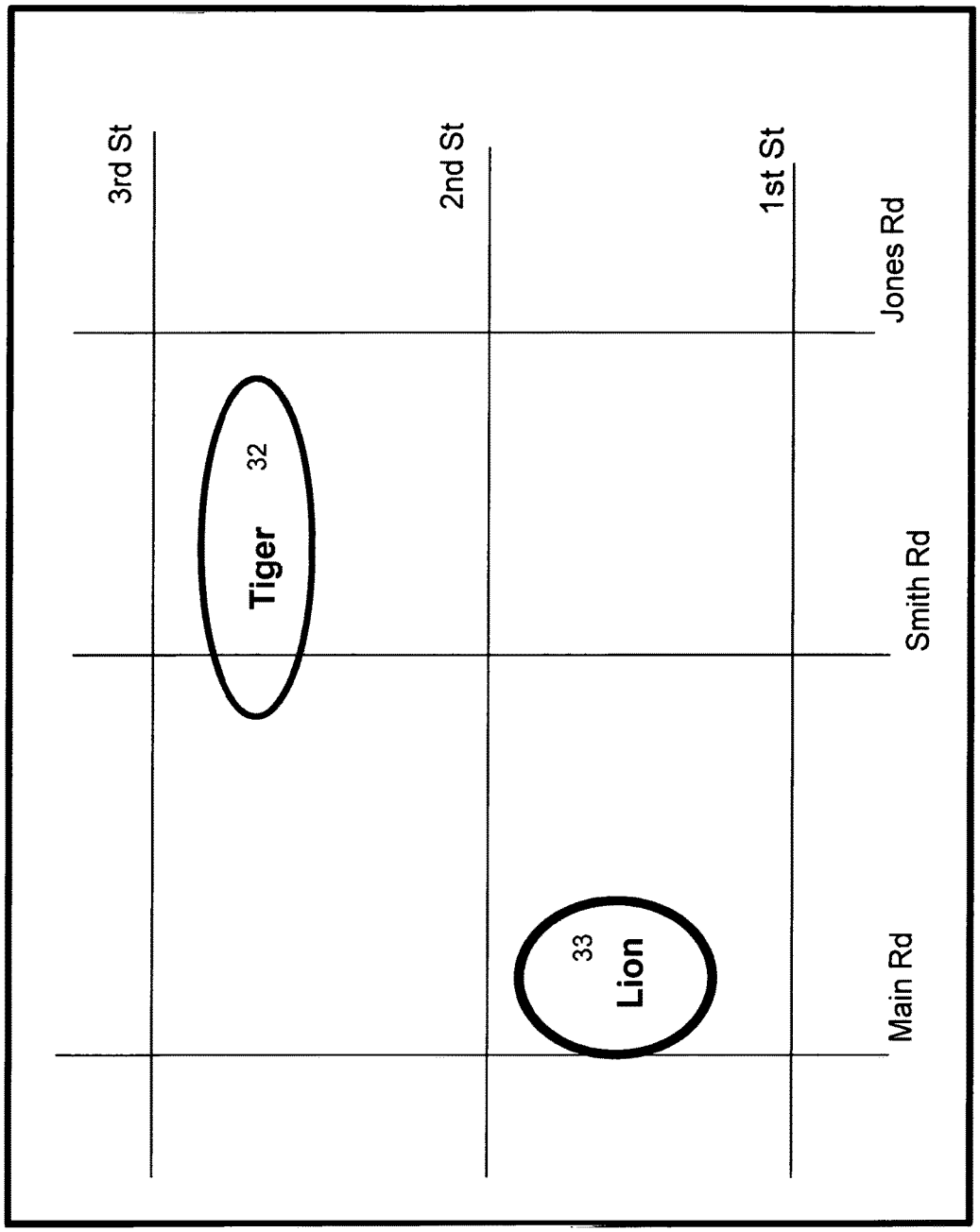
FIG. 7 has fuzziness around 2 NPCs.

7: Fuzziness and Proximity;

See FIG. 7. This is taken from FIG. 3. The map can depict the linket of a NPC as perhaps in fuzzy form, as suggested by the ellipses around the Tiger and Lion NPCs. The actual form of a depiction of course does not have to take the form of an ellipse.

The fuzziness can indicate a deliberate uncertainty about the character's location, as defined by the game. Thus a parameter that the game can pass to the map is a distance measure of the uncertainty. There might be 2 such parameters, if the uncertainty is a function of orientation. One parameter is the uncertainty in the east-west direction. Another parameter is for the north-south direction. This acknowledges that if the AR game is played in an urban game, the street grid can be used to impose a default structure into the geography of the game.

The map can take the parameters and make its own decision about the specific type of graphics around the NPC. Or the map could permit the game to send over graphics in which to depict the fuzziness. This lets the game have more control over the branding of their characters.

In the same game, different NPCs can have different fuzziness. Perhaps some characters are inherently easier to find.

Human players might also have fuzziness.

In the area of the map that is fuzzy around the character, the map can decide how much is clickable, for the linket to be run. Perhaps just the actual area immediately under the linket text or graphics, or the entire area that is fuzzy.

Or the map can let the game decide this.

If the fuzzy areas of 2 NPCs overlap, the map can decide on how to determine which NPC was picked, if the user clicks on the overlap. Or the map can let the game decide this.

Figure 8:
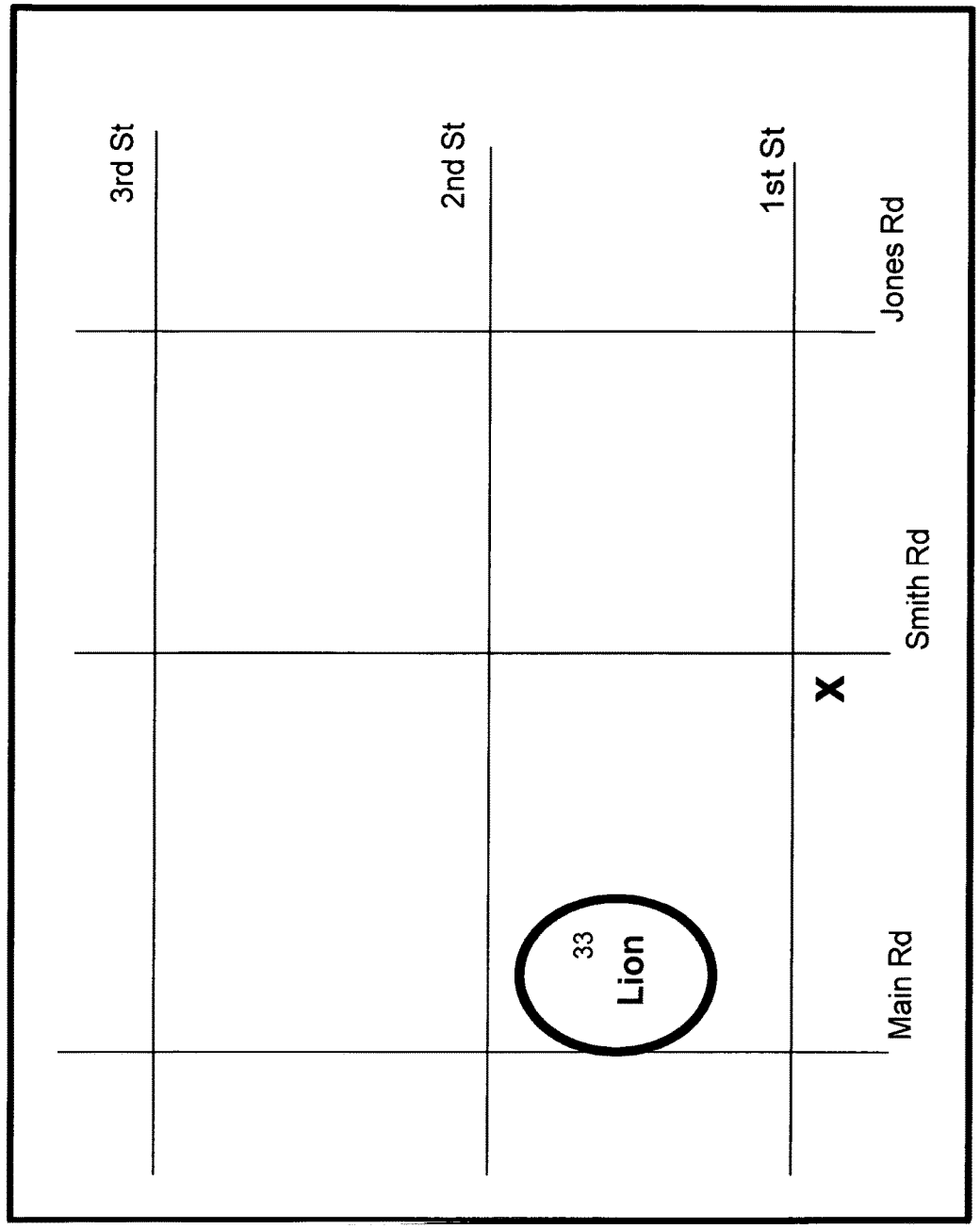
FIG. 8 shows a NPC, depending on the player's location.

Thus far we have not used the location of Jane, the mobile device owner. See FIG. 8. It is derived from FIG. 7. There is an X at the corner of Smith and First. Jane's location. The game tells the map to only show a NPC if the latter is within, say, 100 m of the user. Hence Lion appears on the map, but not Tiger.

More elaborate restrictions can be allowed by the map. One is to let the game define an annalus (a ring). So for example NPCs are shown only if they are between 100 m and 300 m from the user.

Such proximity conditions can also be applied to human players. The map can let the game define different default proximity conditions for humans and NPCs.

In the limit, the map can let the game define different proximity and fuzziness for each player, human or NPC. The map might charge a premium for the game, due perhaps to greater computations and data storage needed by the map.

Another elaboration is for a NPC to be visible on the map as a function of the location of 2 or more players. This could be for a game where several players need to cooperate and be close to each other to catch a NPC. Here, let us be more precise. Jane is currently not a player when she first uses her map to see players and NPCs. The game can impose a condition that the map shows a NPC only if she (the mobile device user) and an actual player are within proximity of each other and proximity of the NPC. The proximities between her and the player and between them and the NPC can be different.

This multiplayer cooperative feature can be used by the game to recruit new people like Jane. The map plays a crucial part in making Jane aware of the social interaction possibilities.

The reader can appreciate that many more elaborate conditions can be devised for what appears on the map on the mobile device. The above is given to describe the inherent basic possibilities.

8: Reassignable Linket;

Currently, the linket has been used to point to a human player or to a NPC. For the former, the linket always points to that human, albeit at different network addresses. There is another case. Imagine a mobile game of tag. One player, Don, is tagged. He has to move around, find other players and tag one of them. In turn, that player has to tag another player.

Figure 9:
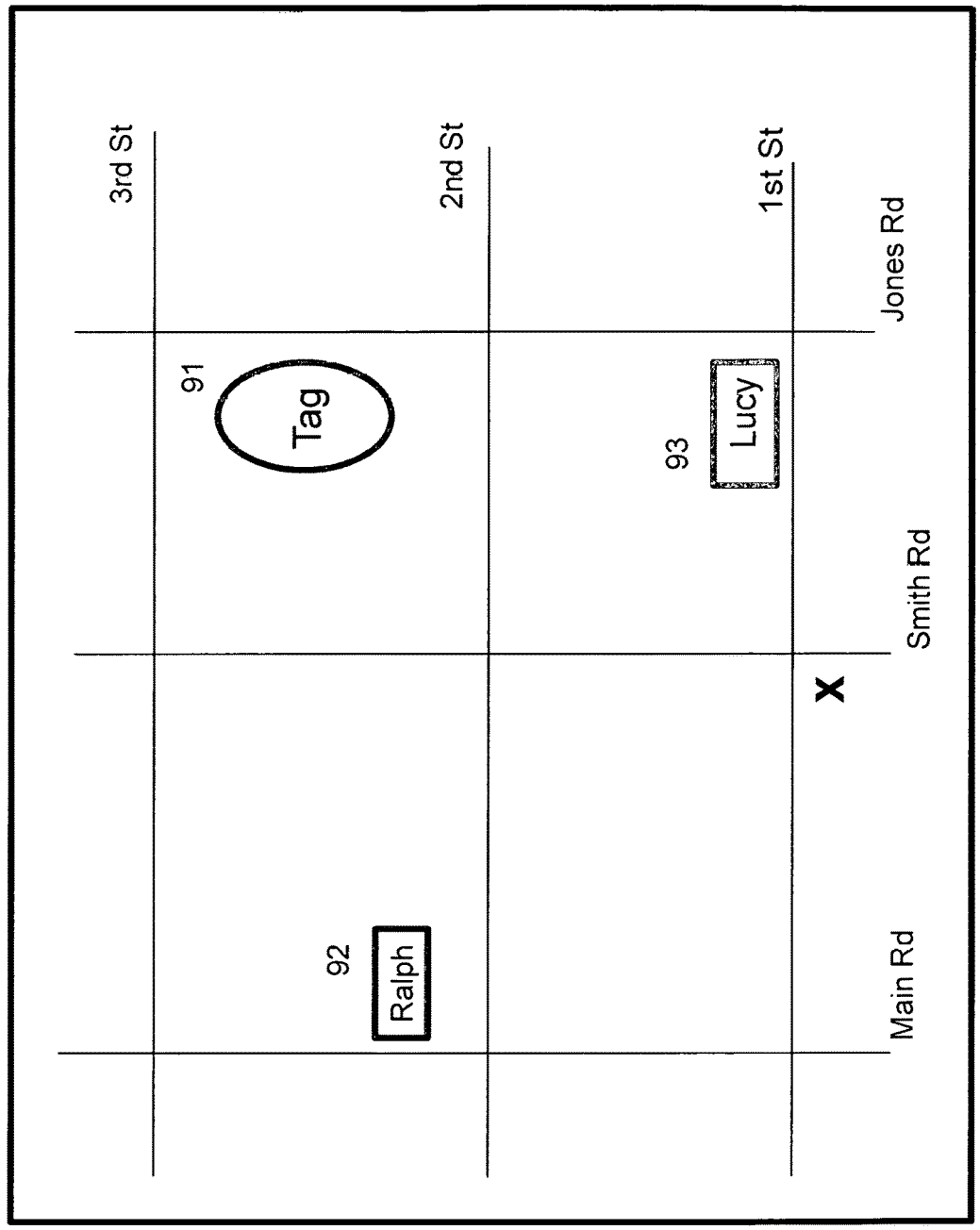
FIG. 9 shows a reassignable linket for a game of tag.

The current tagged person, Don, can be assigned a temporary linket. It has a name, Tag. When Jane, who is not (yet) playing the game, looks at her map, she sees FIG. 9. The X at First and Smith is Jane. Don is Tag 91. Ralph 92 and Lucy 93 are current non-tagged players. In this particular instance, the Tag is shown with fuzziness, while the other players are not. If Don manages to tag Lucy, then he would be shown under his own linket (if he has one) and Lucy is then shown as Tag.

This example was for the tag being passed between human players. A tag could also be assigned temporarily to a NPC. The NPC could then chase a human player. If the human cannot evade, then she becomes tagged.

Figure 5:
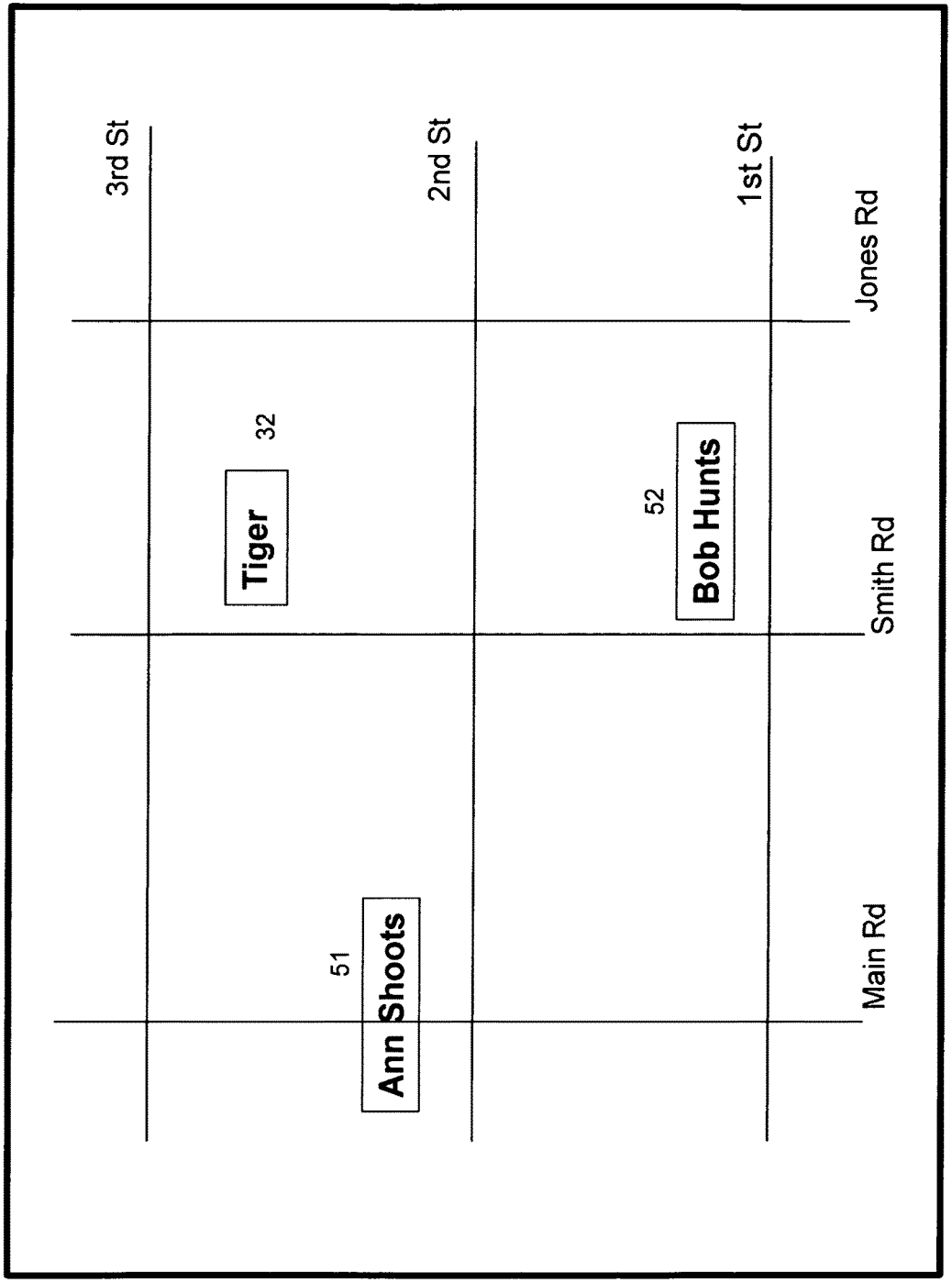
FIG. 5 shows a map with 2 players hunting a character.

9: Temporary Linkets;

FIG. 5 showed 2 human players with their linkets. But in general, when Ann and Bob joined the game, they should not be assumed to own linkets. Too restrictive. What the game can do is own a set of linkets. It assigns a linket to Ann and another to Bob, and they play under those names.

But Ann likely wants to customise her temporary linket, even though she does not own it. Letting her do this gives her more incentive to play the game on many occasions. Her customised linket might appear on the game leaderboard, if she plays well enough and often enough, for example. Increases user retention. This differs from the previous section where the linket name, Tag, was independent of the user who temporary held it.

Figure 10:
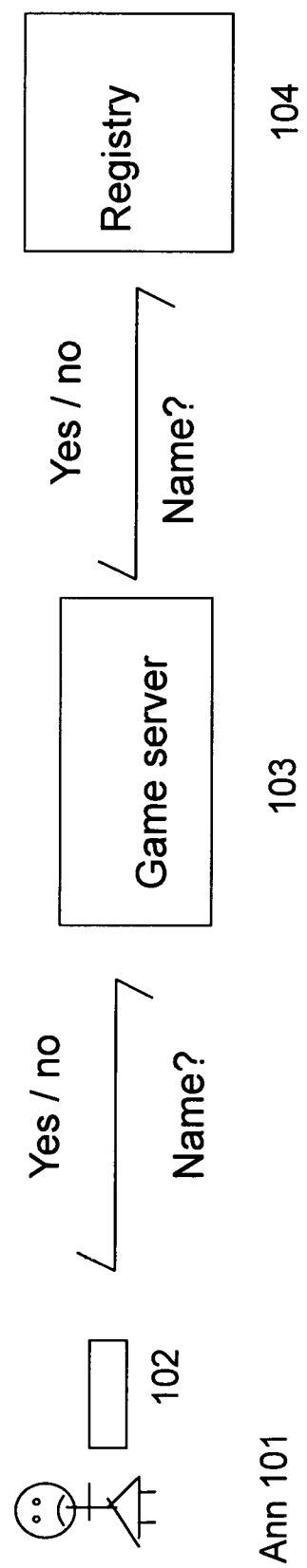
FIG. 10 shows a user picking a temporary linket name via a game server.

Instead, see FIG. 10. Game server 103 buys some number of blank linkets from Registry 104. When Ann 101 with her mobile device 102 first interacts with game server 103 (when her game app starts), she can suggest a name for 'her' linket. This is uploaded to game server 103 which forwards it to Registry 104. If the latter finds it unique, it replies yes, which is forwarded to Ann. If not, it replies no, which is forwarded to Ann. Her instance of the game asks her to make another name for the linket.

An opportunity arises for the game company. It measures how often and how successfully Ann plays, under her linket. It can offer to sell the linket to her, possibly at a markup. The more time Ann invests in playing the game, under a linket associated with her, the greater the lock in. If she comes to regard it as her personal brand, she is incented to buy it. Otherwise the game company has the right to reassign it to another player.

Thus the initial offer of a 'free' linket to Ann when she first plays the game is a means for the game company to get more revenue. More indirectly, the Registry also benefits. Knowledge of the Registry is spread to Ann, and if she uses social media to tell her friends, to them.

10: No Linket Registry;

Suppose the linket Registry is not used. See FIG. 11. Jane 111 has her mobile device 112. On it, she has a map app that talks to map server 113. The map has a clickable item. We continue to call this a linket. It represents a human player or a NPC in a game.

Jane clicks the linket. Several things could happen.

First. The map app already has a deep link for the linket. Picking the linket causes the deep link to be run on device 112, and installing and running the game app.

Second. The map app connects to the map server, and asks for the deep link. If the map server already has it, the map server sends the deep link to device 112. Else the map server sends the linket to the game server, which sends the deep link to the map server, which sends it to device 112. A variant is where the game server is given the address of the map app by the map server, and the game server replies directly to the map app. The latter is listening at a port for the game server.

Figure 11:
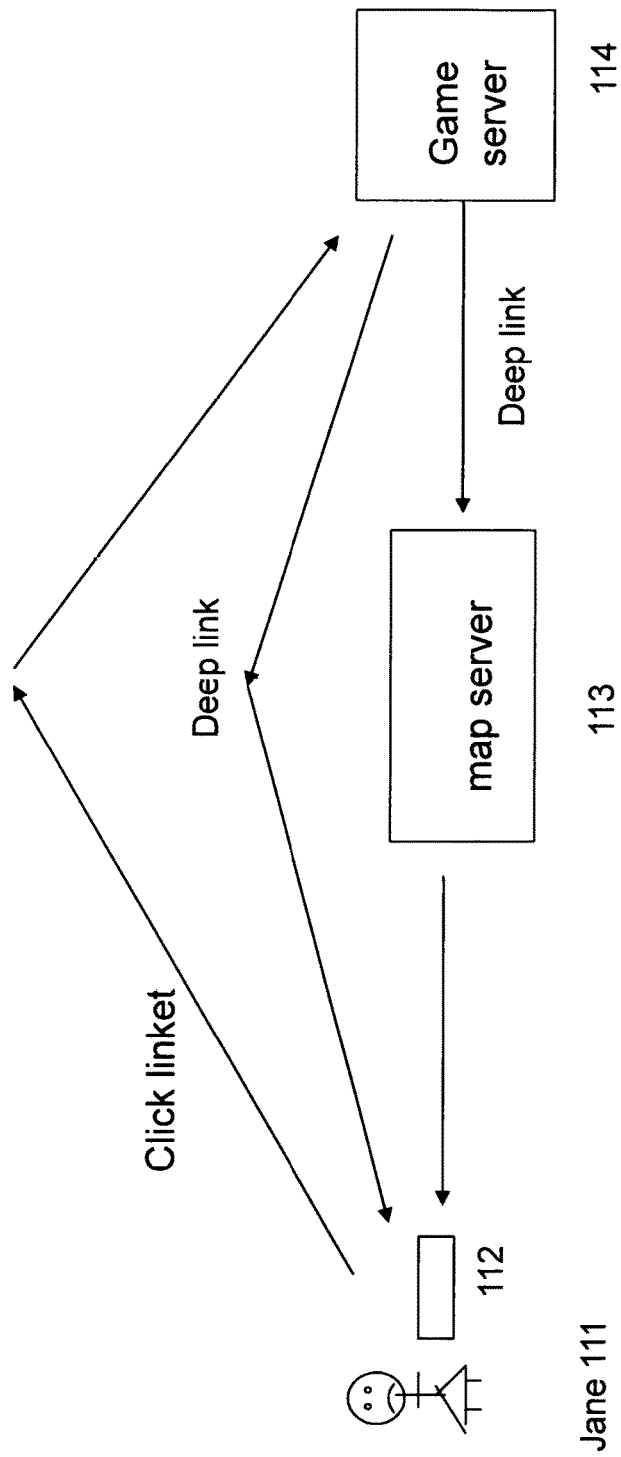
FIG. 11 shows a map server and a game server interacting with a user.

Third. The map app connects to game server 114, sending it the linket. The game server replies with the deep link. Device 112 runs it. This possibility is depicted in FIG. 11 by the top 2 pairs of arrow segments that bypass the map server.

If the linket Registry exists, the map (meaning the app and its server) can use the Registry for some games. And it can bypass the Registry in the manner described above for other games.

In one implementation, the map exposes an API (Application Programming Interface) so that third party game companies can interact with it in the ways described above.

Figure 11A:
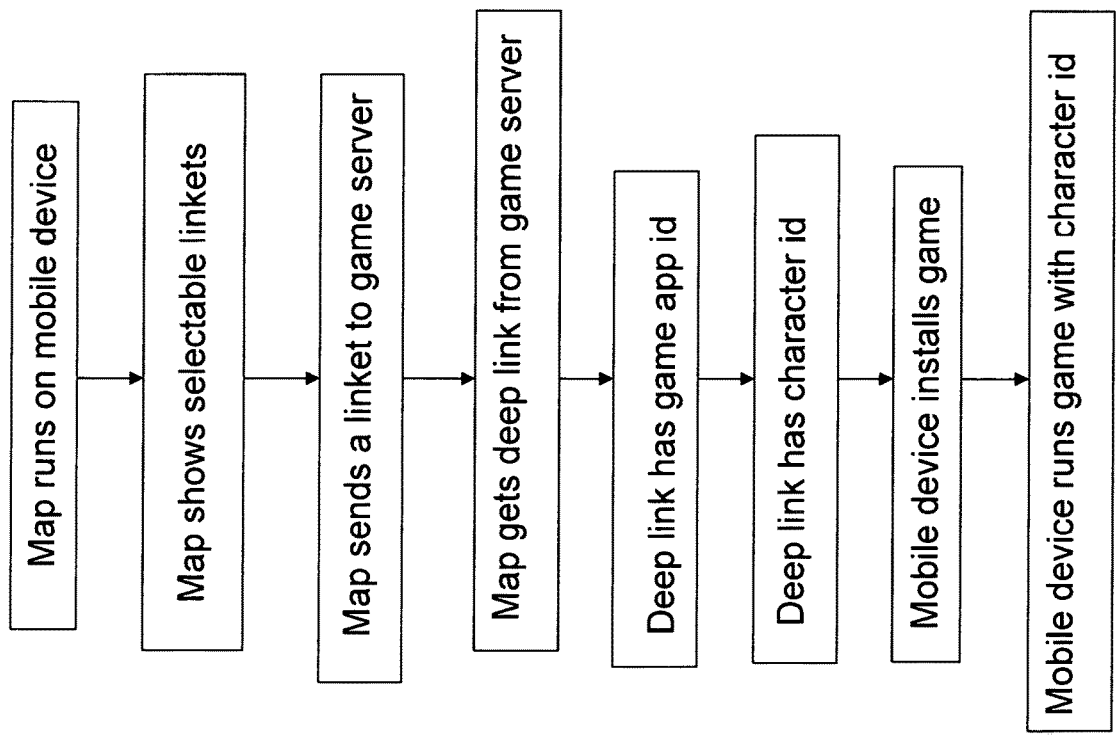
FIG. 11A is a flow chart of a map contacting a game server to run a game.

FIG. 11a is a flow chart depicting this method. It can be compared to FIG. 3a which is a flow chart where the linket Registry is used to map from the linket to a deep link.

11: Intelligent Agent recommendations;

Section 2 described how Jane, the owner of the mobile device, can use the GUI of the map app to show which types of game linkets should appear on the map. In contrast, the current section explains how recommendations or pre-emptive filtering can be done, in the absence of her taking specific actions. See FIG. 12. It shows Jane 121 with her mobile device 122. On it is assumed to be running a map app (not explicitly shown in the figure). The map communicates with map server 123. The latter interacts with Intelligent Agent 124.

Map server 123 interacts with Game server 1211. The latter sends linkets to the map server, as indicated by the 'linkets' label on the arrow from the Game server to the map server. In turn, the map server sends some of these linkets to the map on device 122, which shows those linkets.

Intelligent Agent 124 might run just on Jane's mobile device 122. Or it can have components that run on any of her other computational devices. These might include a laptop or a personal computer. Essentially, Jane lets the Agent surveil her activities and interests across her machines.

For example, the Agent might know what movies and music videos she watches on YouTube 125. It might know what books and music (hardcopy or electronic) she buys on Amazon 126. It can know what movies (DVD or streaming) she watches on Netflix 127. It knows what music she listens to on Spotify 128. It parses her pages on the social networks she is a part of, with the example here of Facebook 129. Likewise it parses her postings on Snapchat 1210. These actual companies are cited here merely as examples. The reader can substitute similar companies.

From these the Agent makes recommendations to the Map server. This helps the Map server and the map on her device. Suppose in the neighbourhood of Jane, as shown in the map, there are linkets from many (hundreds?) of (AR) games. These cannot all be shown at the same time on the map. Too cluttered. It is also wasteful in her device battery for linkets to be downloaded to the map from the Map server, if the linkets are never shown. A rule of thumb is that to transmit or receive a bit wirelessly takes 2 orders of magnitude more energy than to perform a typical computation using a bit on the device itself.

It can be assumed that when a game company pays for its linkets to be shown on the map, that it tells the map server some information about the game itself. Is it a scavenger hunt? A science fiction game? Etc.

Likewise, suppose the Agent knows from Jane's reading habits on Amazon that she likes science fiction novels. And from her Netflix rentals, that she watches Star Trek and Star Wars movies. The Agent tells the Map server that Jane likes science fiction themed activities. In turn, the Map server filters the games whose linkets it has, to pick those with science fiction themes and send only their linkets to the map.

There are feedback loops possible. The Agent could surveil her activities on the map. If the map shows linkets for certain games, and Jane clicks those to download and play the games, then this is valuable data to the Agent and the Map server. Granted, in this case, the map and its server do not need the Agent, because the map can find out if the linkets it shows are picked by Jane. But the other cases shown in FIG. 12 involve activities that the map server has no direct access to.

The advice from the Agent to the Map server is very desirable to the Map server. It means that the linkets it shows on the map are contextual ads. Improves the odds that Jane will click on the linkets and run the games. The Map server gets compensated for this by the game companies.

Note that the Intelligent Agent is not assumed to be deployed primarily to assist the map. There has been much work done on Intelligent Agents, whose usefulness is broad.

Figure 12:
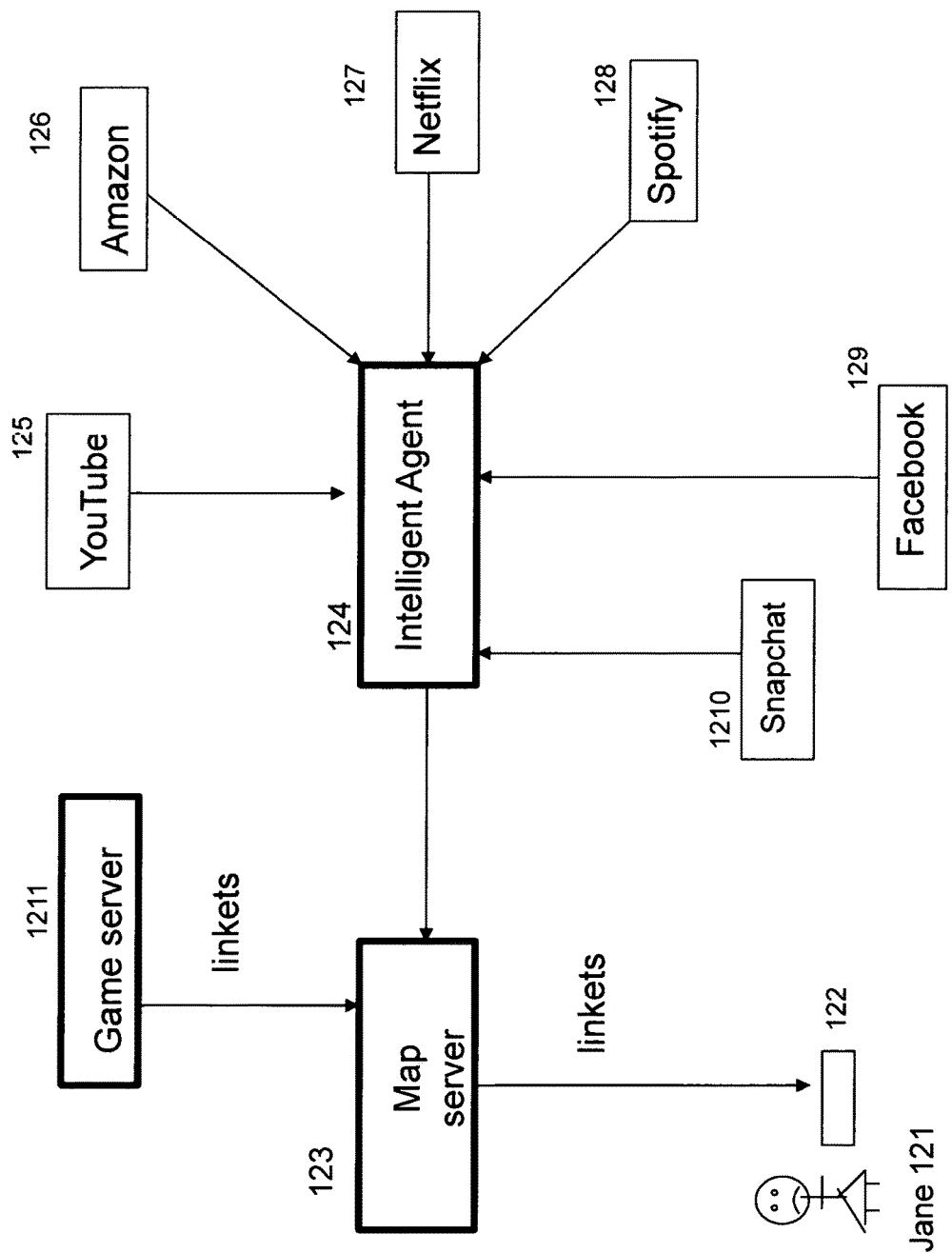
FIG. 12 shows an intelligent agent interacting with the map.

In FIG. 12, at a low level, the transmission of data from the Agent to the Map server can be done in various equivalent ways. The Map server might have an API which the Agent uses (=calls) to push Jane's preferences. Or the Agent could have an API which the Map server calls to pull Jane's preferences from the Agent. Or the interaction could be more complex. The gist is that the data can be sent from the Agent to the Map server.

A further point. A variant is where the Agent sends some or all of the data about Jane's preferences to the map on device 122. Perhaps because the Agent or a component of it runs on that device. If the map app on the device gets the data, it can upload some or all of it to the Map server. As explained above, a major benefit is for the Map server to decide what linkets get downloaded to the map, and which linkets not to download.

12: Audio;

A linket could have audio. For example, the owner of the linket, who defines the textual content of the linket, and ancillary data, can define an audio recording. It is uploaded to the Registry, and available to users who access the Registry. This might be simply an audio rendition of the linket text. The audio could have music, like a jingle. The audio tune could be copyrighted in its own right.

When a linket is shown in an app, like a map app, the app could allow the playing of that related audio. If no such audio exists, the app could say aloud the text of the linket, using Text To Speech (TTS) methods.

We referred to a map app running on Jane's mobile device. A map, by definition, is primarily visual. A diagram. But in this submission, the map could have audio features. It could say "At 200 meters northwest is a Starbucks" or "At 150 meters at 2 o'clock is a gym". The former has an absolute orientation. The latter uses a clock orientation, possibly where 12 o'clock is defined by an axis of the mobile device.

The audio could play upon explicit action by Jane, like clicking on an audio icon in the map. Or it could autoplay. Perhaps as Jane moves in the general direction of that target. Another reason for autoplay is if the map is meant for blind users.

Now suppose when Jane uses the map, it says "300 meters northwest is Tiger 5". She then says or types the obvious question, "What is Tiger 5?".

The map replies in audio, "A character in the game Madcow. Do you want to play?".

If Jane says yes, or types yes into an input text box, or presses a yes button that the map puts up, the app (or a bot) is downloaded and run, as per the procedure mentioned earlier. Here, "Tiger 5" is the text of a linket.

It can be seen from this that the map app might be purely audio. In current parlance, it could be called a bot. A program that interacts with the user via a conversational mode. The latter can be with the user types or saying audio, and where the bot says audio or perhaps shows text on the device screen.

The map can readily be programmed to say the linket name and to permit an interaction involving the user asking and picking a linket. For example, if the map already has the ability to say the name of a landmark near Jane, then similarly when she is near a linket location, it can do likewise.

Figure 13:
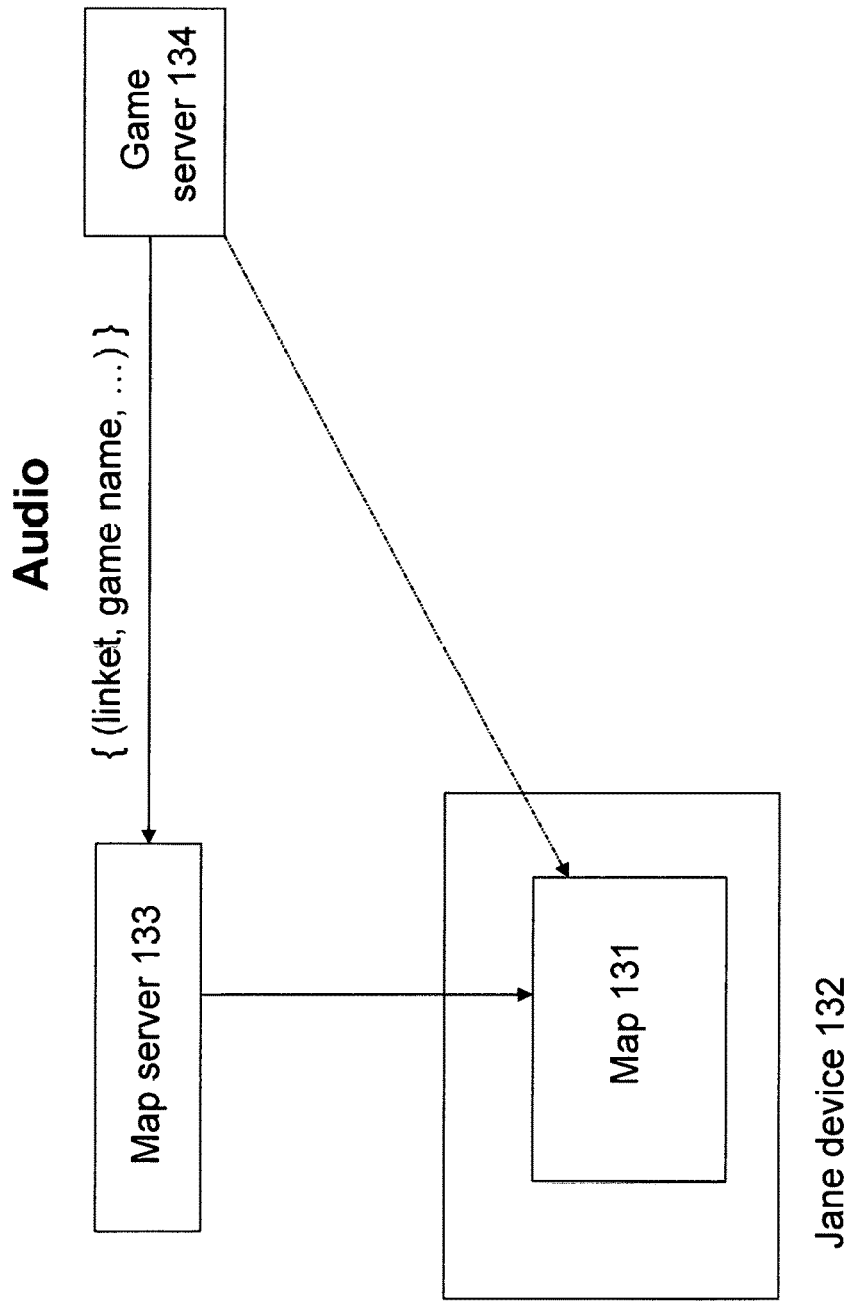
FIG. 13 shows the game server sending audio to the map server.

FIG. 13 shows the method. There is Jane device 132, running Map app 131. The map gets data from Map server 133. In turn, the Map server can get some audio data from game server 134. The example data, shown as the label of the arrow from the game server to the map server, is data that can be sent in audio form. As discussed earlier, this can include the audio of the linket text and the audio of the game name. If, for example, the audio of the game name is omitted, the game server might send over the text of the game name. The map could later play that name as TTS generated audio.

Note that there of course can be non-audio data sent from the game server, as discussed in earlier sections. The game server can send other types of audio data, giving more information in audio form about the game. Like audio saying the game free to play, assuming that it is.

In FIG. 13, the curly brackets around the audio data indicates that a plurality of information about several linkets can be sent.

The dashed line in FIG. 13 from the game server to map 131 is where the game server would send audio data directly to the map running on Jane's device. As per the previous section, the game server would not send audio about all the linkets in an area around Jane. This is wasteful if she likely would not be interested in most. In this case, the map server could forward some of her preferences, as suggested by the Intelligent Agent of FIG. 12, and her location, to the game server. The game server then makes decisions about which linkets to send to the map.

Suppose Jane is carrying or wearing an electronic device with an output mode that can vary if the device (perhaps in tandem with another device carried by her) detects elements of games around her. An assumption is that the device is not specific to a given game. In contrast to other devices. For example, there is a Pokemon Go Plus device that vibrates if the user is near a Pokemon that can be captured. This device is only used for Pokemon Go.

Our device can have a type of output mode, like changing colour. The choice of colour can depend on the type of game element nearby. The device can allocate an unused colour to showing the presence of a linket pointing to a new game possibly hitherto unknown to Jane.

Or the device might have output in the form of vibrations. A given type of vibration can designate presence of linkets.

If the user reacts to the presence of a linket by wanting to pick it, how this is done depends on the device. And possibly on whether the device interacts with other devices of the user, like a cellphone. In a simple case, if the device accepts input from the user, it can communicate with the phone, perhaps to bring up a map app showing that linket. Or to send a command to the phone, to execute the linket. This means asking the Registry for the deep link and then installing (if necessary) the app and running it.

The device could communicate with the phone via some wireless method, like Bluetooth or WiFi.

13: Deep Link with a Network Address;

In FIG. 1, items 12, 13 and 15 showed various forms that the deep link can take. Consider the case where our user Jane clicks on a linket of a human player, like item 51, Ann Shoots, in FIG. 5. Jane is in Los Angeles, and so is Ann. Suppose that player Ann is at the temporary network address 10.20.30.40. There can be an advantage to the game using a deep link with that address, like madcow://10.20.30.40. See FIG. 14. It shows Jane 121 with her mobile device 122.

Figure 14:
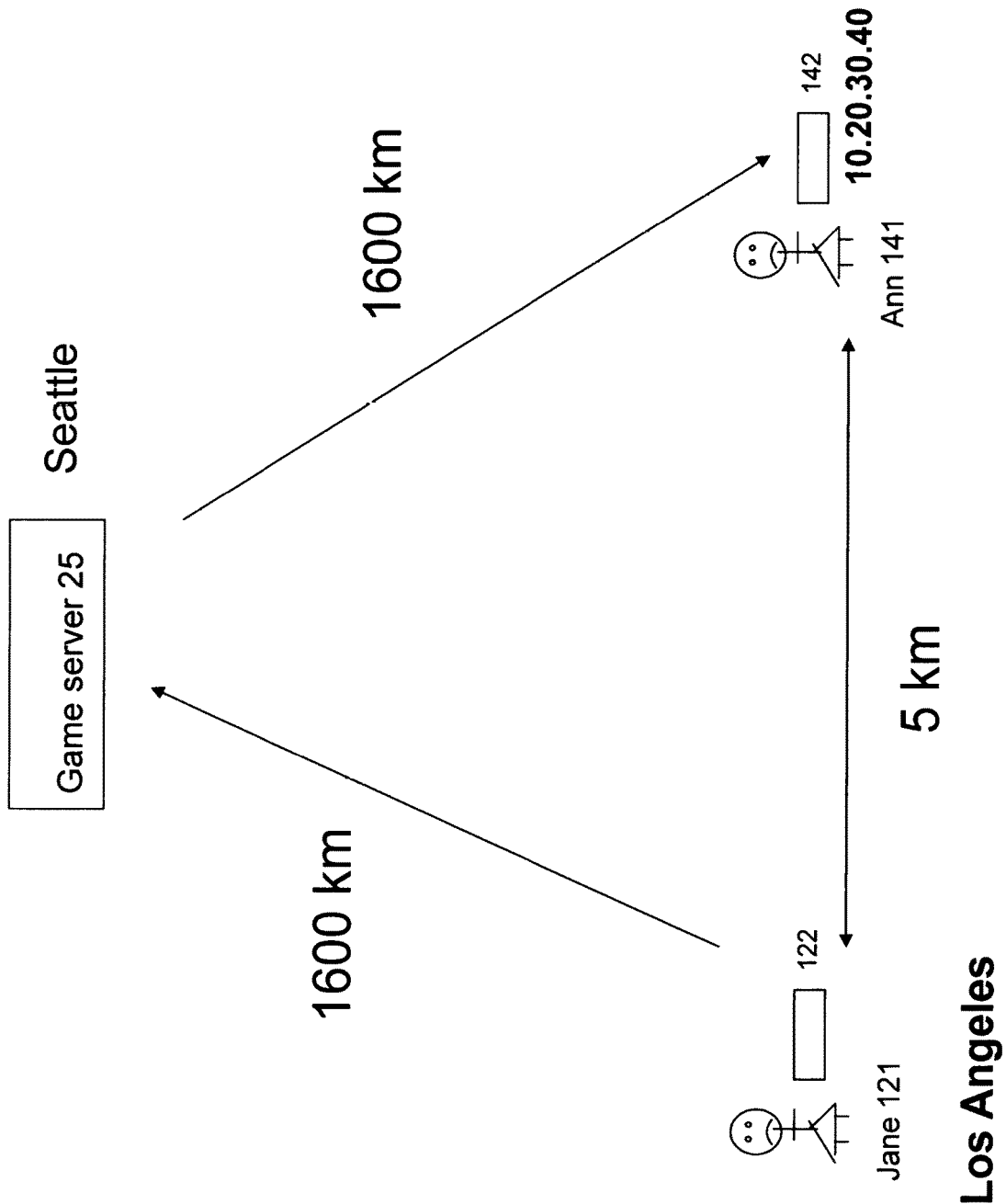
FIG. 14 shows a watcher interacting directly with a player.

Somewhere near Jane, as suggested by FIG. 5, is Ann 141, with her device 142. The latter has the network address 10.20.30.40. Suppose the deep link has the player id of Ann, and when Jane watches Ann play, the data from Ann's device goes to the game server 25 and then to Jane's device. If the game server is in Seattle, FIG. 14 shows that the data goes some 3200 km. But if Jane's game instance gets Ann's network address from the deep link and connects directly, that distance might be, say, 5 km. The latter connection offers much less latency. It also reduces the bandwidth and computational loads on the game server.

We chose Seattle as a location for the game server because of the common scenario where the game company has its machines in the cloud. Perhaps hosted by data centers run by Amazon or Microsoft. Data centers tend to be in places with cheap electricity and cool weather.

In general, we expect that the watcher (Jane) and the player (Ann) are in the same town, because Jane saw Ann's linket in a map of the town that Jane is in. But a typical game company is unlikely to have its servers in every major town.

When Jane's device sends a signal to Ann's network address, we rely on the hardware routers and switches and hubs in the town finding short, optimal paths between the users' devices. Cisco and other hardware vendors have spent immense time implementing routing algorithms for the Internet in their devices.

Note that Jane's game instance would likely still check in at various intervals with the game server. But maximising the direct communication between Jane and Ann greatly benefits them and the server.

This offers an optimisation feature that map 22 and its map server can offer. The server has a set of linkets for the region shown by the map. The server can ask the Registry for the corresponding deep links. The server can favour those linkets with deep links that have explicit network addresses. The server can double check by mapping those addresses to geographic locations.

So when deciding which linkets to download to the map, the server can use as a factor of choice, whether the linkets refer to deep links with network addresses in the town that the map is showing.

The map can make this available as a option to Jane. Though from a useability vantage, it can omit presenting it to her by showing or explaining about explicit deep links having network addresses. It might just have some buttonor popup option, say, with a label "fast".

This section discussed the case where a human player had her network address in her deep link. For a NPC that typically exists only in the game server memory, this is meaningless. But there is a possibility for a NPC to have a network address. Imagine a person Ralph with a device on the Internet, in the region of the map shown in FIG. 3. A mobile game might offer him the ability to host a NPC in his game app instance. Assuming that he has the game on his device. He might be in a coffeehouse or cybercafe or an office, for example. He does not have to actively play the game.

The game might host one of its NPCs at a device and then let it have a linket with a deep link with Ralph's device address. As for the human players, this lets other new players interact with it faster. By having fewer connections to the game server.

The game could incent Ralph to host the NPC by compensating him in some manner. Maybe with items he can use in the game.

14: Popularity;

Another means of deciding which games to show on the map is by the popularity of the games, as measured by how often a game's linkets are clicked. There are several ways to do this. One is for the map server to keep a count of how often each linket in a region is clicked on, for some preceding period of time, like the last 24 hours, the last week etc. The most popular linkets, regardless of game, are shown on Jane's map. There can be a toggle at the GUI level to let her decide if she wants to see the least popular linkets, by this measure.

Another way to group the linkets by popularity is to sum up the clicks per game, remembering that a game can have several linkets. Only the most popular games' linkets are shown. Again with a toggle to show the least popular games' linkets if Jane desires this.

Games can span cities or countries. The region in which the above popularity is measured can vary, and this itself could be presented as a choice to Jane. Show the most popular items in her town or her country, for example.

Figure 15:
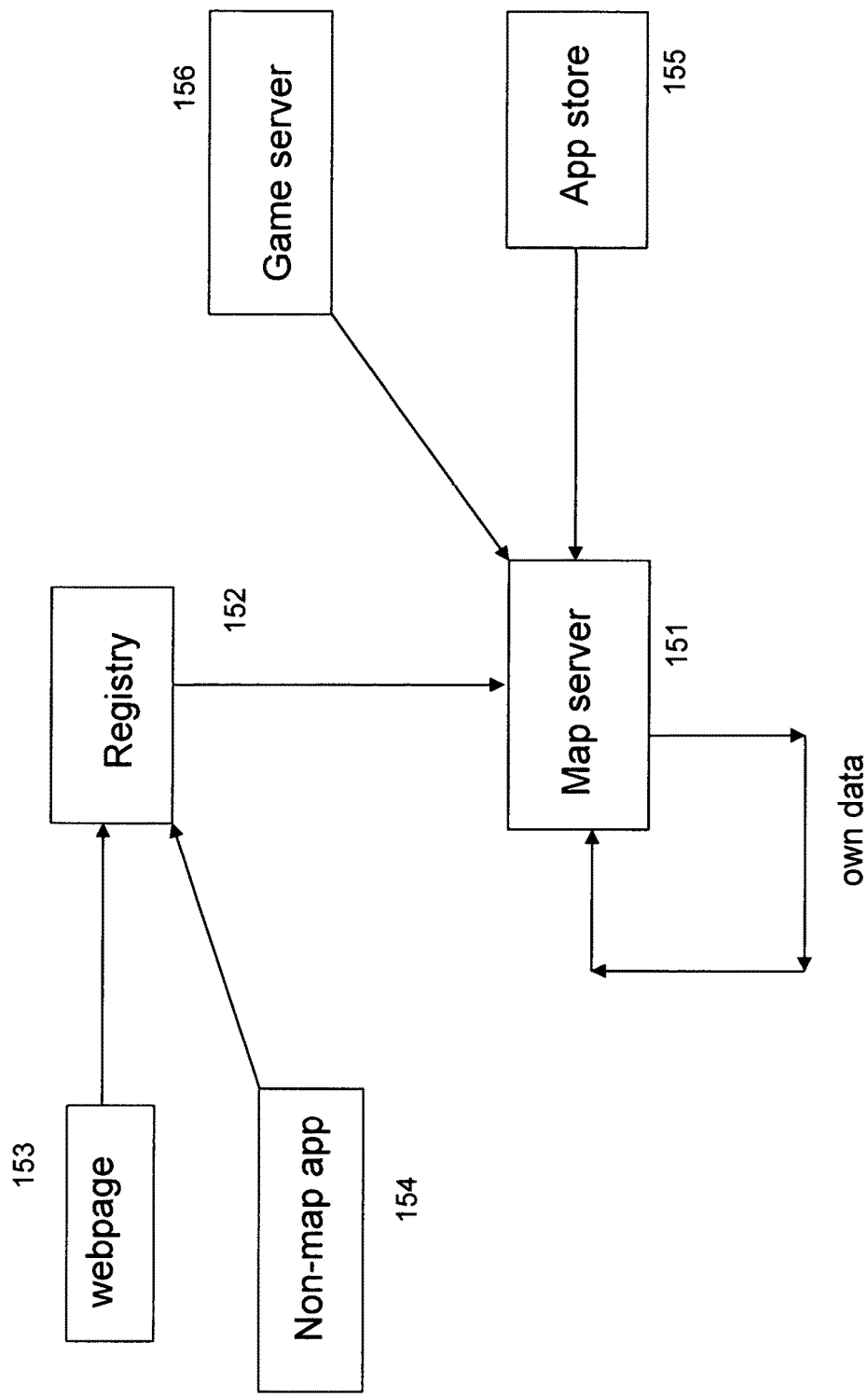
FIG. 15 shows a map server finding the popularity of games and linkets.

The above ways are where the map app gets clicks directly from its users. Other ways to use or find the popularity of a game are shown in FIG. 15. Map server 151 can ask the linket Registry 152. A linket can appear in webpages. So if a linket is clicked in webpage 153, which appears in a browser, Registry 152 gets this click, to furnish a deep link. Also, the linket can appear in a non-map app 154. This leads to a query to the Registry. Hence the map server can periodically ask the Registry for statistics about the most popular (or not) linkets for games that also have those linkets associated with the map.

The map server can ask the various app stores 155 for popularities of games. Here the app stores have no information about the popularity of items or players (corresponding to linkets) inside a game. So this is a coarser measure.

The arrows in FIG. 15 from the map server to itself designate the earlier methods where the map server looks at its own data.

For the games whose linkets might be shown in the map, the map server can ask the game servers 156. This can be for data about the relative popularities of various players or NPCs in a game. Only the most proficient players might be shown, or perhaps the reverse if Jane so chooses to see. In general, asking the game servers lets the map server choose between linkets in a given game, and not between linkets in different games.

Though the latter can perhaps be done if the games are from the same game company, which might make ways for their linket popularities across their games to be compared.

15: Indoors and Underground;

Thus far, we described games and maps for navigating outdoors. Typically, the maps use a combination of satellite GPS and basestation analysis to establish the location of the mobile device. But the reader will note that nowhere did we actually use specific traits of GPS or basestations. The methods of the earlier sections also pertain to the use of maps on mobile devices when the devices are indoors or underground.

To allow this might or will require the devices to have other hardware sensors, embedded or attached. Perhaps an infrared range detector, as one example. Another requirement could be beacons installed inside the structure. These beacons would transmit wirelessly to the user device. Also likely is the use of databases outside the device. Like one with a map of the interior of the structure that the user and her device are in. But given such hardware and databases, the linkets can be used as earlier described.

16. Shop Interacting with a Game;

On an existing map there are likely names or images of various locations, especially shops. The latter might pay the map to explicitly show the shops. This section discusses how a shop can interact with a game company via a linket, to the benefit of both.

Assume that the map has an icon or text representing a shop. The shop can partner with a game company. If the shop is part of the chain, the icon on the map for this particular shop might be displayed as slightly different from other shops of the chain, to indicate the following. See FIG. 16. Mobile device 160 runs map 161. In it is an icon for shop 162. The icon is clicked as in step [1].

Two choices are possible. One is for popup 163 to appear. In it can be text like shown in the figure, to induce the user to, for example, play a puzzle. The other choice is for the contexts of popup 163 to appear in the map 161 window. If the user presses the go button, then in the enclosing window of map 161 or popup 163, or in another window (not shown), the user can play a simple puzzle. Or answer a survey, for example. Or give contact information (like a phone number or email address), as other case. Then popup 164 might appear. Where the user can click on a button or link to start the download and running of a game from the game company. As indicated by step [3].

There can be simple variants of the steps in the previous paragraph. For instance, instead of popup 164 appearing, its contents could appear in an existing window, like popup 163. And the user might not have to do an explicit final step of pressing a button to start the download of the game.

The linket implicitly is invoked when 'click' is pressed in popup 164. The click 'button' or 'link' in 164 can be represented by an image associated with the linket of the game XYZ or by the title of the game.

Figure 16:
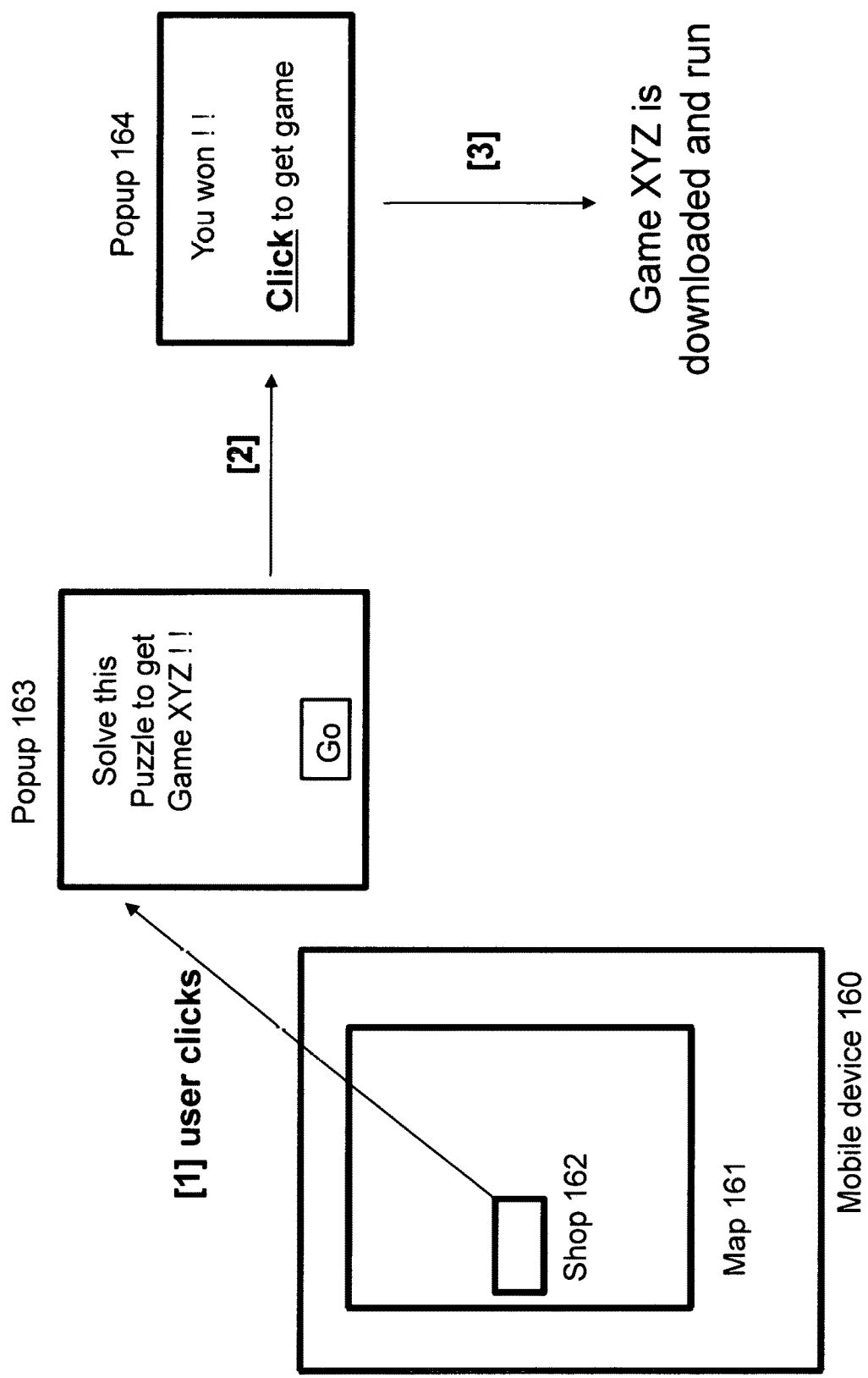
FIG. 16 shows a shop interacting with a game via a linket.

Another variant of the steps in FIG. 16 is where all the activity happens in the map window. In step [1], the user does some action in map 161. The map graphics in item 161 can be partially or totally replaced by, say, the contents of popup 163. Any activity done by the user happens in item 161.

There could be a reset button that if picked causes the item 161 to revert to showing the original map. Or instead of a reset button, the user does some action. Like triple clicking inside item 161. Or sweeping left to right in item 161. Or perhaps shaking mobile device 160. The latter action could involve using any accelerometer in the device to detect the motion.

And once the game is downloaded to device 160, item 161 reverts to showing the original map.

Informally, FIG. 16 can be considered a flow chart.

When game XYZ is installed on mobile device 160, it can be run automatically or manually. Thus far, the game does not have to use augmented reality. But suppose it does. The game can start up centred on or near that store.

If the linket has a network address in its deep link, that address could be of a human or NPC character near the store. Note that the linket maps to a deep link, and that mapping is assumed to be held in the linket Registry. The game company periodically updates this mapping. It knows the fixed location of the shop. It can get the network and geolocations of human players. And it always knows the location that it associates with a NPC that moves through the city. At any given time, the game server can find the closest player to the shop location. If this is a human, the server sends the network address of the human's mobile device to the Registry.

So when Jane, the user of mobile device 160, gets XYZ running, it shows her the screen or PoV of the closest human player.

Another case is where the deep link of the linket maps to a fixed location in or near the shop. Typically when Jane first saw shop 162 on the map, she is not at the shop. So having the shop associated with game XYZ and the game having a NPC or location in the shop is beneficial.

17: Non-Map App Showing a Linket;

The submission described map apps that show linkets as extra data. A variant is a non-map app on the user device. It can show text and graphics for some purpose. Suppose the app also uses the device location. The app could have a mod such that when the app is in a region near a linket location, the app shows a window with a map with the linket. Or the app writes a text with the linket or says audio that gives an indication of the linket and where it is. If the linket is shown (in text or graphics), it can be selectable. If the user picks it, then as before, the game app is installed if not present, and the game is started with a contextual input.

For example, the non-map app might be livestreaming some video content. The showing of the linket can be a means for the app to derive some ad revenue, if the user clicks the linket.

The decision by the app to show a linket can be based on 1 or more of the following reasons.

First. The app is about gaming; especially AR or VR games. This can include the important case where the app might be for various uses, but Jane's current use of the app is, say, about discussing mobile games.

Second. The user of the mobile device has played mobile AR/VR games before.

Third. The location of the device is near a location of a linket for a AR game.

The app can be assumed to be able to detect the first reason. If the app is, for example, showing a discussion in text or audio, the app could use AI or syntax analysis to detect the topic. The second reason can be found by the app interacting with, for example, an Intelligent Agent on the device, that tells it Jane's habits in this regard. The third reason is found because the app has access to her device location. And the app interacts with game servers for mobile AR games. So the app gets the linkets and associated locations and looks for proximity of any of these to the device location.

18: Non-Game Linket or Bot;

Return to the case where a map shows a linket. Thus far to focus the submission, we described linkets that pointed to game apps. But non-game apps or bots are possible.

One case is tour guides. These can be for walking tours or where the guide has a vehicle carrying passengers. For a walking tour, the guide might be termed a flaneur, if the tour is in an urban area. While for using vehicles, Los Angeles has prominent examples of companies offering tours of Hollywood and Beverly Hills of actors' homes. Suppose the map shows a linket for a tour. The linket might be along a route of the tour. The linket could move along this route, where the linket designates the current or near-current location of a tour vehicle. If Jane clicks the linket, an app for the tour is run. (As usual, if the app is not present, it is downloaded to her device.) Via the app, she can do one or more of—reserve a seat; pay for the seat; see a stop where she can hop on board.

This introduces the possibility of bots. The submission mostly considered the case where picking a linket on the map gives a game; often AR. The inherent nature of many games (especially AR) is that there is a necessary visual component, while an audio component could be secondary or absent. But in the case of tours, there could be little need for visuals in the tour app. If so, the app could be replaced by a tour bot. This has a conversational interface, typed or spoken. With rudimentary or no visuals. Jane uses the bot to get a seat or to meet up.

For the latter, directions to the meet up location can be given as audio or text. Or the bot could integrate with the map to show the location on the map.

19: Warning to Drivers;

The mechanisms of this submission are for a mobile device where the user is NOT the driver of a vehicle. Map apps are considered useful and safe for drivers. Typically in a hands-off manner. But the submission described steps where the user takes a more active role vis a vis the map. And of course with a subsequent interaction with an installed app that is often a game. It is extremely unsafe for drivers.

20: Variants;

To keep the user engaged with the map, the map could have a puzzle, that can be run if say she clicks on a button. That button might be at a specific location on the map; a location of a shop for example. Or the button might be in the map app window, but outside a main subwindow that actually shows the map. Or run step could be when say the user triple clicks anywhere in the map.

This puzzle or other type of activity could be logic written by the map company. Or, if the puzzle is associated with a given location, like a shop, the puzzle could be uploaded from the shop server or a game company.

If the user does the puzzle (or other activity), then the linket appears and the user clicks it. Or the completion of the activity runs the linket, without the linket being explicitly shown.

If the puzzle (or other activity) invokes an embedded linket, the puzzle might not be at a location on the map associated with the linket. The puzzle might appear as graphics at some arbitrary location. The puzzle could move on the map, as though evading the user.

21: Human Controlling a NPC;

Another important variant is when a linket points to a NPC of a game. The NPC lives only within the construct of the game, in the database of the game server and on the game clients on the mobile devices. The user Jane who picks the NPC linket might be able to affect the NPC. In the simplest way, by being able, inside the game that Jane just downloaded, to move the character through the city. Perhaps the intent is to evade capture by human players.

These players can be using the game in AR mode. They are moving through the city streets and through their game instances, their mobile devices show overlays of the surroundings.

In contrast, Jane might not see any such overlays. She might just be using another map, this time in her game app, to move her NPC. Here, we stretch the term NPC if it is now under the perhaps partial control of a human. For Jane, the game without overlays is not augmented reality. But to the other players it is. So we still consider the game to be AR, at least for some players.

If Jane affects a NPC, this is not necessarily control. There could be a stochastic element in the game. Jane picking the NPC linket means that in the game any directions she gives to the NPC have a random component introduced. Also, several users like Jane might pick the same NPC linket. Each can try to affect the NPC, but none has sole control.

22: Search;

Jane runs a map on her mobile device. Most if not all maps have an option where she can enter an address, which the map then shows (if the address is valid). The search capability can be expanded to include showing or using linkets that point to games and characters in those games.

Suppose initially the map shows no linkets. Jane types or says "Hyperman". A name of a popular AR game she heard of, but never played. It is not on her device. A variant is where she brings up a map option that says, eg, "games", before invoking Hyperman. But with advances in search machine intelligence, it can be anticipated that this might not be necessary.

The map processes her input, finds that this refers to a game, and shows any linkets associated with the game on the map itself. The map records her search term in its history of her, to aid future searches. If her device runs an Intelligent Agent that can surveil her activities across all apps she uses, then the Agent can also record and analyse her search activity on the map.

If Jane picks the linket to go into the game, this picking happens in the map, and the map records this as added data about her preferences. This can guide future searches. The map can find from external databases that Hyperman is in a given genre of games. So in future, if the map were to show linkets from games on her device, preference can be given to that genre. Or if Jane were to give the map a search term, when it searches through games, it can start first with games in that genre. A popular term might coincidentally appear across games of several genres, so her choice of a given genre can help the map distinguish and separate search term collisions.

Maps often have a directions option. Letting the user get directions from one location to another. This can also be applied to linkets that have associated fixed locations.

A variant is when a linket moves on the map. Suppose the linket follows a predictable or known route. The former can arise if the game server regularly sends the map (server) the current location of the linket. The map has software that keeps a record of the route. The map detects that the linket appears to be going recurringly on this route. Hence it can predict where the linket likely will be in the future. Or the game could explicitly tell the map the route of the linket.

In either case, the map can let Jane ask for directions from, say, her current or future location, to the location of the linket. If she leaves her location at some future time, she tells this to the map. The map takes into account the amount of time she is likely to need, to extrapolate where she can meet the linket with a minimum travel time. The map might need her mode of travel. By asking her or using her search history or asking her Intelligent Agent.

A map lets the user add a label to a fixed location, which could be that of a shop or museum, for example.

Likewise, Jane's map could let her attach a label to a linket. If the linket moves, the label follows. The map might let Jane's labels be seen by other users if she gives permission. The text of her label can be added to the map's database for future searches by her. And by others if others can see her label.

Suppose Jane inputs Hyperman and the map shows several linkets for the game. These might be of humans and NPCs. The map gives her an option to pick several linkets. It draws a route that goes by all of them. The map can try to make the route optimal, typically defined as the shortest distance to reach all the chosen linkets. Or the shortest time, for a given mode of transport.

If the map knows from the game which linkets are for humans and which for NPCs, then the map can offer a routing option, where it finds a route only or mostly to the NPCs. And another option to find a route only or mostly to the humans.

The attraction to Jane is that the game could involve interacting nearby with as many characters as possible. Perhaps for NPCs, she has to capture or tag them, as in Pokemon Go or Ingress.

A variant is where her search term ended up with the map showing linkets from several games. The map can still let her pick several linkets and will find a route to them.

A map can let users rate and review places. This can be extended to rate and review the characters represented by linkets on the map. Giving more aid to other possible players or viewers of the game. The map can supplement these by making accessible ratings and reviews of the linkets at the linket Registry.

23: NPCs Responding to a Route in a Map;

Jane visits Seattle. She is in a Starbucks 171 in FIG. 17. She wants to go to the nearest Nordstroms 172.

Figure 17:
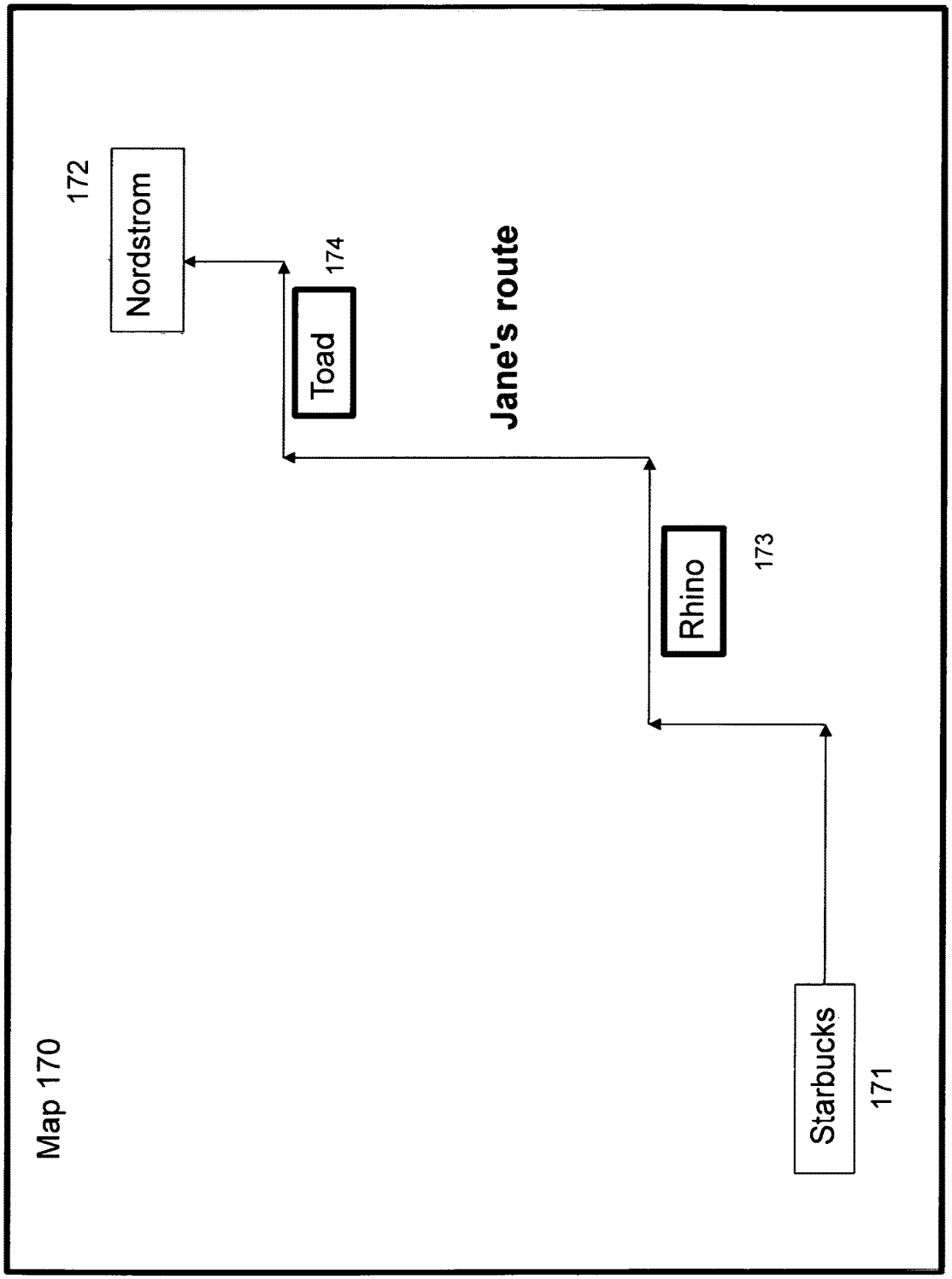
FIG. 17 shows a map with a route and linkets of NPCs on the route.

On her mobile device she brings up map 170 and asks it to find a route from her current location to Nordstroms. The map does so, as shown in FIG. 17. (For clarity, FIG. 17 omits the street grid.) The map adds 2 NPCs, each from a different game. She sees an image of Rhino 173 and Toad 174. Jane recognises Rhino as a character in an existing game Madcow that she has on her device. She has played Madcow several times. She remembers that Rhino is a high value capture in the game. She decides that when she walks near Rhino, she will run Madcow and target it. Because Madcow is already installed, clicking on the Rhino linket will be fast; nothing to download.

But Toad is unfamiliar to her. From querying the map, perhaps by double tapping on Toad or some other user action, she finds that it is a character in another game, Grok, that she has never played. Grok is not on her device. Also Toad is shown on the map as jumping up and down in place. (This is a simple animation, perhaps done as a GIF, but there could be other graphics ways to accomplish it.)

Rhino only appears on her device, though she does not know this. Toad might appear on other users' devices. She does not know this either.

If Jane picks Rhino for more information, audio could play. Either audio generically about the entire game Madcow, or audio specifically for the Rhino character. The audio would originate at the game server. The map could get the audio from the game server or possibly the Registry.

If the audio has words, these might be mostly in a given human language. There could be different versions of the audio, for different languages. The audio chosen to be downloaded to her device can be based on what languages she knows. The latter can be inferred by the map asking her Agent. The Agent can know, especially if her device lets her speak into it, as is the case for a cellphone. And the Agent can know her language from what text she types into it, or the languages of any other apps she uses or of any webpages that she reads in a browser of the device.

If Jane in her search also specified an arrival time or told the map that she wanted to minimise the travel time, the map might not show any NPCs. The context could be that she does not want any game interruptions. So showing a NPC can be construed as spam.

More generally, the map could interact with an Intelligent Agent on her device. The Agent could have access to her calendar. The map knows the current time. It can ask the Agent for any upcoming events. The map uses this to decide whether to show NPCs or not.

Another case is where Jane is a passenger in a bus or train. Especially if she travels the route regularly. The Agent can deduce this from her habits. But suppose she is taking a bus or train route for the first time. There is no history of her travel on this route to use. Even so, most buses or trains have published schedules and routes online. It is straightforward for an Agent or map to use the online routes. Especially perhaps for a map, which has the expertise encoded about its map areas. The Agent or map can deduce that Jane is moving along a path, and the path appears to be along a known bus or train route. Also, Jane's speed can be found. If this corresponds with the expected speed of a bus or train along that route then she probably is on that vehicle. Another confirmation can be if from the schedule of the vehicle, it suggests that a bus or train is roughly where she is at the current time, and going in the direction she is going.

Given all this, the map can decide that it is appropriate and safe (she Is not a driver of a vehicle) to show game linkets on her device.

A game could have instructions for the map server, telling the map to display an NPC linket on or near the route it just drew on Jane's device. The intent is to encourage Jane to play the game so that she can easily meet the NPC as she goes along the route. The NPC might have its own route, and this route can be adjusted to intersect Jane's route. The intersection can be dynamically altered to maximise the chances that Jane meets the NPC.

This dynamic variation of a NPC location differs from the prior art. Currently, the location of a NPC in an AR game is largely independent of the locations of human players. The NPC might move somewhat, to evade the human when she approaches, but essentially the NPC does this around a fixed location. And that location may be independent of players' actions.

FIG. 17 can be contrasted with FIG. 3. The latter does not have any routes, and the character linkets in it are at locations independent of the user who gets the map. But FIG. 17 has characters whose location is largely a function of the route. Or even whose existence might largely be a function of that route.

For a given NPC, as alluded to above, there is no requirement that if it appears in Jane's device, that it has to appear in other instances of the map or the game, on other users' devices. In general. However, any given game can override this. It could require that an NPC in it must be visible in other instances of the game.

In the above, the map drew Jane's route and put NPCs on or near it, after making the route. A variant is where there are NPCs already associated with given locations and the routing algorithm tries to make a route that will go near these NPCs. If this does not increase the travel distance or travel time "significantly". What the latter means can depend on various heuristics made by the map; perhaps with data from the Agent. And possibly with data from the games that want their NPCs shown. A game can furnish an estimate of the typical encounter time spent by a human who interacts with one of Its NPCs. Different NPCs in the game could have different encounter times. Maybe reflecting the level of difficulty in interacting with (eg. capturing) the NPC.

Another variant is where there are already NPCs present in the general area of the map. The map draws Jane's route. Some NPCs could be at fixed locations, or moving around those locations. Other NPCs could be wandering over much of the area. The map can transmit the route to a game server for some of the NPCs. The map can also send some information about Jane, perhaps suitably anonymised, to the game server. The game server decides to let one or more of its NPCs to move towards the route. Perhaps it considers Jane as an possible or existing player likely to spend money on the game.

Figure 18:
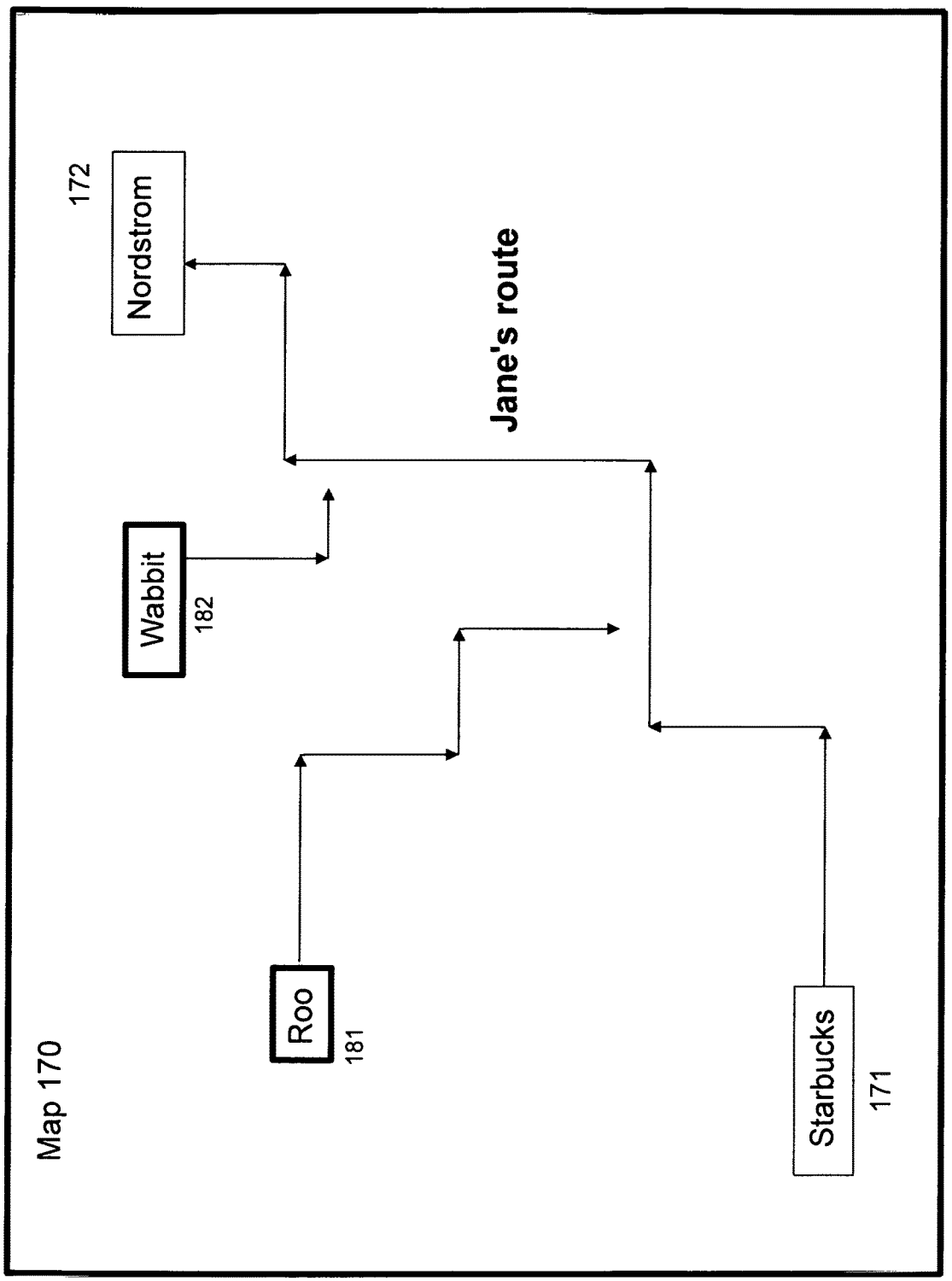
FIG. 18 shows a map with a route and NPCs intercepting the route.

See FIG. 18. Imagine that when Jane sees the route, the NPCs of FIG. 17 do not appear. Now there are pre-existing NPCs Roo 181 and Wabbit 182. FIG. 18 shows the paths they take to intercept Jane's route. Roo and Wabbit are in general from different games. Of course FIG. 18 could have several NPCs from the same game.

Given this, the path that the NPC makes towards the route, or maybe simply that the NPC disappears from its current location and reappears on the route, can be made by the map. This focuses on the skill set of the map that has the geographic data and the routing algorithms, whereas the game server typically has no such data or expertise.

In general, there can be several other users in the area of the map. Suppose some also have routes through the area that they are travelling on. A serious optimisation issue can arise. With multiple routes through the area, the map and perhaps in tandem with the game server, decides where and when to move its NPCs to be as close to as many desired players as possible.

An alternative is the earlier case where a NPC is visible only to 1 user. A game that makes this decision can ignore the issue of the previous paragraph. It makes as many NPCs as it wants, and the map puts these in the route of all or most of the users.

Previously, we said some NPCs might be placed near or on the route, or they might move to intersect the route. An alternative is for the NPC to be placed on the route or to go to the route, and then to move along the route. Towards Jane or from Jane.

24: Gamification in the Map;

Thus far, we described how to show and go from a linket in a map to the app pointed to by the linket. And the app is often a game. The map had no intrinsic game aspects. But there are possibilities for simple gamification in the map itself.

One case is for a linket to appear for a short time on the map. Perhaps with information shown about how long the linket will appear. This short time can act to induce Jane to pick the linket before it vanishes.

Another is for the map to compute Jane's speed. It gets regular updates of her location as she is moving. From this her velocity and speed can be found. The map can also get an estimate of the downstream bandwidth to her device. For a given app that is not on her device, the map finds the size of the app; from the app store, for example. This app is referred to by a linket that is ahead of her on her route. The app size divided by the bandwidth is how long it takes for the app to be downloaded. Suppose this is 20 seconds.

Then suppose along her route is an NPC or human linket, that points to the app. And given her current speed, it will take 35 seconds to get to the character. The map shows a message saying, for example, "Last chance to squash Woggles !!" (the character). The point is that for a linket that implies an app download, enough time should be allocated for the download if the linket is picked. The app needs to be functional before the linket location is encountered. And some extra time should also be allocated for Jane to get her bearings in using a new and unfamiliar app.

Of course, the linket might first appear on her map when she is further away. And she could have clicked it then. But the last chance message is a further inducement or simple gamification.

Also, suppose Jane installs the app after she passes the linket location. Depending on the game, she might need to be near the location to interact with the character. She is more likely to do this if she has not reached the location, because it is still ahead of her. Whereas afterwards, she has to turn back. Still possible, but the odds of her doing so fall.

A game can give the map more contextual information, for the map to decide whether to show a linket from the game or not. Suppose Jane is in a coffeehouse (and not necessarily a Starbucks). The map finds her location and deduces that she is in a coffeehouse. Or a bar. The map could have a NPC whose context of surroundings is a saloon or coffeehouse. A drinking establishment. The NPC has a backstory and perhaps AR visuals that will appear in a player's mobile device that invoke the situation. Having the NPC linket appear on the map when Jane is in the coffeehouse can improve the odds of her picking it and playing.

The previous has a possible ab initio issue. How does Jane know the backstory or visuals when she has not picked the linket? One answer is if she has played the game before and knows something about the character. But suppose she has never played that game. And she has never heard or seen images of the character from online discussions or social media. The name of the character could invoke something of the context. If the character is shown in visual form, that imagery can have the invocation. If the character is accompanied by audio, the latter can allude to a drinking establishment.

25: Player Puts a Linket on a Map;

Jane plays a game on her mobile device. In the game, she gets a linket. The game lets her put the linket onto a third party map. She runs the map while the game is also running. The map has an API that lets the game connect to it. Jane finds a location on the map. Then by various graphical means, perhaps initiated by her tapping that location, the linket is put onto the map at the location. Others who use the map can now see the linket.

This lets her drop off game content, like a NPC, at a place. Where others can interact with it.

One variant is where Jane needs to go to the location. The map gets the location from her device, as the current location of the device. Another way is for her to be able to pick a location on the map, without going there.

The above required the game and map to be concurrently running. Instead, suppose the game can be closed first. Here, when we say Jane gets a linket, this can include a code (a bit string). The linket and code are held in some data structure, and the structure could be copied into the device clipboard. (Assuming the device has a clipboard.) The copying can be done by Jane picking an option in the game, which does the transfer. Instead of her manually copying the structure from the game into the clipboard.

After this, Jane stops the game. She runs the map. She picks a location on the map. There is an option in the map, that she picks, to paste data from the clipboard. The map is assumed to know the format of the data structure. It extracts the linket and the code. The code can be some password or identifier that tells the map to authorise associating the linket with the picked location. It prevents an arbitrary user from putting a linket on the map. The game company might have gotten the code from the map company at some earlier time.

When the map associates the linket with the position, after it verifies the code, the map can charge the game company for doing so. Or it could have charged earlier, when it issued the code and before any user got the code from the game.

The above treated the map and game as separate apps. But suppose the game shows a map. And the map comes from map company XYZ, that has a standalone map XYZ2. The map in the game could have customising features different from XYZ2. Inside the game, Jane can pick a location and associate a linket with it. This association can be transmitted by the game to the map server. Likely, the map server has an API that makes this possible. Other players can now see the linket at that location on their map XYZ2 instances.

The advantage over the earlier cases is that Jane does not have to bring up a separate XYZ2 map app. Indeed, she does not need to have XYZ2 installed. A simpler user experience for her.

Having the interaction between a game and a map enables games like scavenger hunts. Players can deposit clues and rewards across a town. Letting others hunt for those items.

This section essentially closes the loop with earlier sections where a user could interact with a linket in a map.

26: Ride Sharing (Taxis, Uber, Lyft, Didi);

This section looks at apps with maps, but whose primary purpose is not the showing of maps. A major case is apps for ride sharing. By the latter we include traditional taxi services. Some taxi companies could have an app that lets a person call a taxi. That app has a map. We also use ride sharing in the more common parlance, relating to companies like Uber and Lyft. Such companies might not have vehicles but subcontract to freelance drivers who do.

Earlier, we discussed public safety. A driver of a vehicle should not play a game on a mobile device, initiated by picking a linket in a map. More generally, it has been and is an ongoing concern for some apps, to detect if the user is a driver and discourage the use. But for ride sharing an opportunity arises. Suppose the app is only meant for a person hailing a ride. Or if the app is also used by the driver, then suppose that the app has a mode only used by the driver, and another mode only used by a passenger. Internally this can be implemented by a binary state of (driver EXOR passenger). At the GUI level, by having the app start up and showing two choices—driver, passenger, and the user can only pick one.

Consider where the app detects that it is running in passenger mode. Possibly the app can detect if the device is stationary. One or both of these lets the app show a map and also show linkets of games on the map.

One advantage is that the ride sharing company can advertise that the games it enables are played safely. A possible competitive edge against other games that might be played by drivers.

Figure 19:
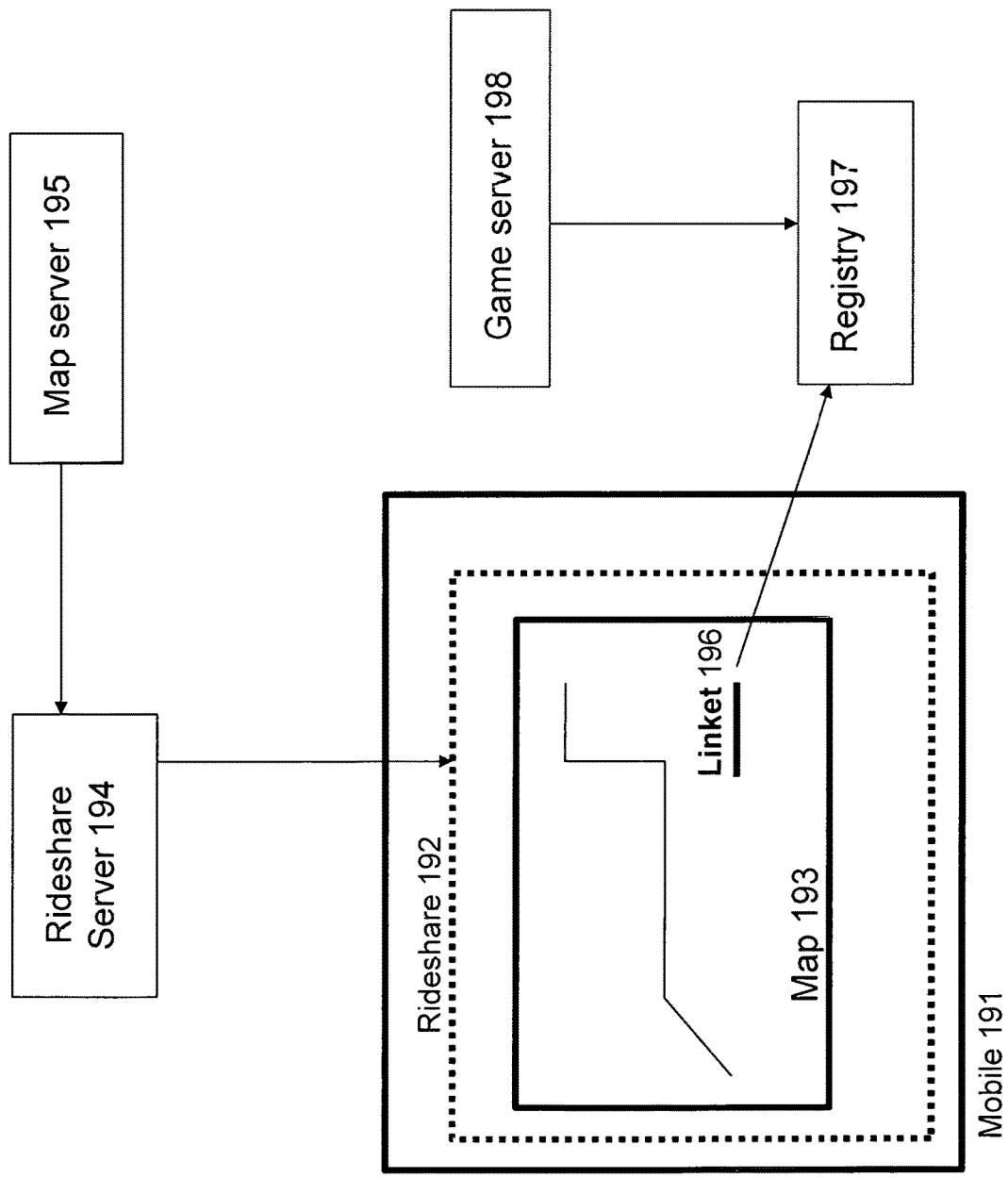
FIG. 19 shows a ride share app with a map containing a linket.

See FIG. 19. It shows mobile device 191. In it is the app Rideshare 192. The latter depicts map 193. The map has a route drawn, indicated by the zig zag line segments. The map also has a selectable linket 196. The horizontal solid line under 'linket' is meant to indicate that it is selectable. An actual display of a linket in a map can use other visual cues to designate this state. And the representation of the linket can be text or graphic.

Rideshare 192 communicates with its rideshare server 194. That server gets the map data from map server 195. In general, the ride sharing company uses map data furnished by an external mapping firm, like Mapquest Corp., ESRI Corp. or Google Corp. (At least in the US.) Linket 196, upon being picked, invokes a call to the linket Registry 197. In turn the Registry gets the latest deep link information for the linket from the game server 198.

The app might show linkets only when it detects that the mobile device the app is running on is moving. In other words, Jane used the app to get a driver, the driver arrived, and now she is travelling in his car. Only in the latter step will linkets appear on the map. This is a design decision for the app. Showing the linkets starting when the app is stationary gives more time for the linkets to be visible, and hence may increase the chance of Jane interacting with a game. But if Jane is waiting for a ride, she might not want the distraction of playing the game.

When Jane is riding, the app can now say with confidence that Jane is a passenger and not a driver. Even if the app detects that the device is moving at a speed compatible to being in a moving vehicle.

This showing of game linkets lets the app garner more revenue for the ride sharing company. Jane as a passenger may be idle, and so has time for a game. An analogy is the electronic screens present in some taxis and buses. They advertise to passengers as a captive audience. This submission uses the passenger's own mobile device as the advertising medium.

Optimal decisions can be applied. Jane walking around differs from her riding around at higher speeds. The AR games with linkets in the app can be for interactions suited for her speed. And for her not being able to chase a character. It is unlikely that she will want to direct her driver to follow a character on her device. Whereas her being on foot permits chasing and a longer interaction.

Another issue is if the app knows her destination. The app draws a route for the driver, running his instance of the app on his device. Jane's app can also show the same route. Given the route, the app on her device can estimate how long it will take, and also how long to reach various locations on the route.

The app might require Jane to give the destination prior to the driver arriving. To let a driver decide if he wants to pick Jane. The app can use knowledge of the route and the duration to decide what linkets to show.

The reader can consult the previous 2 sections for advice. For example, since Jane cannot chase a NPC off her route if she is unwilling to alter the route, a linket can or should be for a NPC that is on her route and does not move off it. More precisely, 'on her route' means that the NPC is close enough to the route that Jane can interact with it at her closest distance to it.

The NPC can travel along the route, towards her or in the same direction as her. It can change direction. If it moves on the route, this can be at a speed letting Jane have enough time to see it and interact with it.

The decision by a ride sharing app to show game linkets on a map because it is confident that the user is not a driver can be extended to when she is on a bus, train, ferry or some other large vehicle carrying passengers. This includes the case of car pooling. In such cases, suppose Jane is not using a ride sharing app (there would be little need), but she is using any app that shows a map. The app can know from external databases the route of the vehicle, under the assumption that the vehicle regularly travels a route. The app can compare the route with Jane's current trajectory or habitual patterns to infer that she is on the vehicle as a passenger.

Of course, the app could always ask her. But as much as possible, the app should be coded to infer the status of the user, to reduce the cognitive load on the user.

Given this, the app might find the expected duration of her journey. This suggests that linkets be shown on her map. For games that ran be played in the journey's time.

Another extension of this section is that the games with linkets are not restricted to AR.

The app could compute a route that maximises intersecting as many linkets in the region as possible. Or a route that is the opposite; it avoids many or all linkets. Or the user could pick a subset of the linkets on the map. And have a route found that goes near these or avoids these.

Suppose the app has a Heads Up Display (HUD) mode. This can also be used to indicate the presence of game linkets in AR mode. If the game is AR, then this display of game elements outside the game can be used to let the user segue naturally into playing the game. For example, suppose the AR game has visuals of a character, which are shown as AR overlay when the game is played. The same visuals can be sent to the map for the HUD mode. So if Jane has never played the game, the AR visuals give her a flavour of the game, to try to induce her to pick the linket and play.

Thus far, we described a game linket being in a map app or a ride sharing app. In the prior art, very few games (if any) have deep links in them, where the deep links cause the installing of an ad app. This typically breaks the game play focus of the players. But here is an exception. Suppose Jane is playing an AR game on foot. She is walking around a city. But in her immediate surroundings, she has done all the possible tasks in the game. Her game indicates that she has to go to another area, out of walking range. The game shows a deep link for a ride sharing app.

Symbolically, the deep link has the form—
rideShareApp://{[current position]+[destination]}
We stem that the actual form of the deep link can differ. But the above example is used to aid understanding the function of the deep link.

The deep link is dynamically made in the game app. The app knows her current position. The game was using this to show her AR features as she walked around. The current position may be given in latitude-longitude. Ditto for the destination, where more targets exist. The game knows the destination from its server.

If Jane clicks the deep link, the ride share app is installed on her device if it does not already exist. Then it is run with the input of the right hand side of the above deep link, after the colon slash slash. The ride share app is assumed to know the format of the input and parses the input. It makes a route from the current position to the destination and it hails a driver to pick Jane up.

This does break the game play for Jane. But unlike the prior art, the context here is that she is done with game play in her vicinity. She needs to go elsewhere to resume the game. So breaking the game play is necessary and desirable for her.

27: Ride Sharing with Others;

Consider when Jane is waiting with others to catch a ride sharing vehicle. This is the literal case of ride sharing. The earlier case of 1 passenger in a vehicle driven by someone who has a job picking up people is arguably not ride sharing. But in common parlance, especially in the marketing campaigns of various firms, it is described as such.

Suppose Jane and others ride the vehicle. Jane clicks a linket on her device to play a game. The game company and the ride sharing firm have a greater chance to exploit this configuration to get more people into the game. Suppose the others have not played the game. They are sitting next to Jane. Simply by looking at her doing so, it makes them aware of the game. And that the game is interesting enough to Jane that she plays it. Even without her prompting them to play it, the scenario acts as a de facto situational referral from Jane to them that prompts the game.

An enhancement is if the others are her friends or coworkers. It is easier for them to ask her about the game, than if they are strangers. The ride sharing app can ask her, 'Are there other passengers?'. If she says yes, the app can show a linket and let her forward it to them. In the case that she knows them, she likely has their electronic addresses (like email addresses or phone numbers). Jane sends the linket to their addresses via email or instant messaging, for example.

A variant is where the deep link is sent from Jane's device, instead of the linket.

The ride sharing app can offer an inducement to her to do so. Possibly funded by the game company. A related inducement can also be given to those she forwarded the linket to. Perhaps credits in a fictional currency ("gold" coins) in the game. Aids the viral spread of the game.

To some extent, it can be better for the ride sharing app to ask Jane if she has others nearby who might be interested in the game, than for the game itself to ask. In general, the game has no context for asking. When it asks, Jane could be alone, and not riding a car. So the question from the game is just a distraction to her under those circumstances.

The ride sharing app might know that there are multiple passengers without asking Jane. For example, Jane starts as the only passenger, but she lets the driver pick up a stranger for carpooling. Lyte Line Ride allows this, in one instance.

Or the car has a camera in the front, taking photos of the passengers in the back, for the safety of the driver. Many taxis in the US already do this. The camera can be connected to image recognition firmware to easily count the number of people. The count can be sent to the driver's app. This app uploads the count to the ride sharing server, which then downloads it if it is greater than 1 to Jane's ride sharing app. Or if the driver's app knows the address of Jane's ride sharing app, it can send the count (if it is greater than 1) to her app.

Her app can now ask her to forward the linket to the others near her.

But what if the others with Jane are strangers? She might not know their electronic addresses or even their names. The ride share app can convert the linket into a barcode (like a QR code), which appears on her device screen. She asks if the others would like to scan it with their mobile devices. If they do so, and if they have the necessary decoding software (there are free apps for this), then they get the linket and can easily download and watch or play.

Or the ride share app can convert the linket into audio form, as a 'chirp'. Jane's device plays the chirp. If the others have the chirp software, they can run it to record and decode the chirp to get the linket.

Or her device and the other devices have accelerometers. The devices can have software originally written by Bump Technologies (now owned by Google). She bumps her device with another device. This causes the linket to be sent from her device to that device.

Or if her device has a Bluetooth transmitter and another passenger's device has a Bluetooth receiver, the linket can be transferred this way. This can be generalised to any other wireless transmission means that is supported by 2 mobile devices.

A game (and not necessarily an AR game) can have a playing mode where it takes advantage of several players in proximity, like being passengers in a car. Perhaps they can coordinate as a team, where this is done not by passing electronic messages to each other, but as actual voice conversations, so that they have to be in proximity. This increases the social aspect of the game.

28: Mobile App Mobile Store (MAMS);

Consider when Jane uses a ride sharing app to summon a vehicle. The vehicle can have a Mobile App Mobile Store (MAMS) device. This holds instances of mobile apps, taken from the main app stores. Currently the latter means the app stores of Apple and Android.

The device lets Jane download an app directly from the nearby MAMS. It can be located in the front of the vehicle, so that the driver can keep an eye on it. Jane is typically in the back seat, about 1 meter away. The MAMS can be configured as a WiFi (or WiMax) hot spot. Jane's device can connect to it. The MAMS can have a wireless Internet connection, perhaps through a telco like ATT or Verizon (in the US).

Roughly, suppose the MAMS holds 1 Tb. And suppose a typical app is 100 Mb in an app store. (Many are smaller.) Thus the MAMS can hold at least 10 000 mobile apps. Currently (2016), the Android and iPhone app stores have almost 2 million apps each. The MAMS needs to hold apps for the main app stores, because passengers are likely to have devices using those main app stores.

Jane's device can instead of downloading from the standard app stores, first check the MAMS app store to see if it can get the app from there.

An app company can pay to have its app put into the MAMS. And perhaps every time a download is made of the app from me MAMS, the app company pays. The payment might be made to the driver or to the driver's organisation.

Apps in the MAMS are not restricted to games. And for game apps in the MAMS, these in turn are not restricted to AR games.

The proximity of Jane's device to the MAMS can give significant reduction in the download time. Typically, when Jane's device downloads from an app store, the device has to connect to a hot spot or telco basestation. Either might be 100 m away. And the wireless bandwidth has to be shared with other wireless devices nearby. For the MAMS, its WiFi bandwidth is essentially all available to Jane. Unless there are other passengers also using it. But even in this case, there are likely only to be 2 others at most.

Another possible saving for her device is less power consumption when downloading. If her device is a cellphone, most reduce their wireless power transmission level if the other device is at high power (meaning the latter is nearby). For downloading an app, her device likely still has to do some transmitting during this, for synchronisation purposes. Some power can be saved here via using a MAMS.

Another advantage for Jane to download from the MAMS is that because this does not use a telco, the bandwidth her phone consumes does not count against any data download plan she has with her telco. Note that even if the MAMS connects to the Internet via a telco, when she downloads from the MAMS, there is no Internet access needed from the MAMS.

The MAMS might be updated from the Internet when the vehicle is not in use. Perhaps parked at the driver's home. During the update, the MAMS could be connected via a wire to the Internet. It is expected that the contents will not greatly change on a day to day basis. When an app goes into the MAMS, it might be expected to remain there for weeks or months.

The record of which apps are downloaded from the MAMS can be useful. It can differ from the generic record of downloads from the app stores in the Internet. Different vehicles with MAMS could have different download popularities, even if the MAMS in the vehicles were the same. And there is no need for the latter.

A given MAMS could show passengers the most popular apps that have been downloaded from it. This can be valuable especially if it differs from the results for the full app stores.

The MAMS can be understood as a type of Content Delivery Network (CDN). The latter is used to rapidly distribute the same content (typically webpages) over a large area, like an entire continent. MAMS offers a more fine grained CDN, tuned to the demands of a city.

I claim:

1. A method of a map program running on a mobile device;
   the map showing one or more linkets as selectable;
   each linket having a human-readable string;
   the map sending a selected linket to a Registry server on an electronic network;
   the map receiving a deep link from the Registry;
   the deep link having an identifier of a game app;
   the deep link having an identifier of a character in the game;
   the deep link having an Internet Protocol address;
   the mobile device installing the game app if the game is not present on the device;
   the mobile device running the game app with the character identifier as input;
   where the map obtains parameters of an area associated with the selected linket from a game server;
   where the map uses the parameters to displays the area in a graphical manner;
   where the game app interacts with another instance of the game at the Internet Protocol address.

2. A method of a map program running on a mobile device;
   the map showing one or more linkets as selectable;
   each linket having a human-readable string;
   the map sending a selected linket to a Registry server on an electronic network;
   the map receiving a deep link from the Registry;
   the deep link having an identifier of a game app;
   the deep link having an identifier of a character in the game;
   the deep link having an Internet Protocol address;
   the mobile device installing the game app if the game is not present on the device;
   the mobile device running the game app with the character identifier as input where the map shows an area around the selected linket location;
   where the map gets the area from a map server;
   where the map server gets the area from a game server associated with the selected linket;
   where the game app interacts with another instance of the game at the Internet Protocol address.

* * * * *